United States Patent
Lee et al.

(10) Patent No.: US 11,882,036 B2
(45) Date of Patent: Jan. 23, 2024

(54) METHOD OF PERFORMING TRANSMISSION OF HEADERLESS DATA UNIT IN WIRELESS COMMUNICATION SYSTEM

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 310 days.

(21) Appl. No.: 17/297,390

(22) PCT Filed: Dec. 10, 2019

(86) PCT No.: PCT/KR2019/017346
§ 371 (c)(1),
(2) Date: May 26, 2021

(87) PCT Pub. No.: WO2020/122539
PCT Pub. Date: Jun. 18, 2020

(65) Prior Publication Data
US 2022/0006736 A1    Jan. 6, 2022

Related U.S. Application Data

(60) Provisional application No. 62/777,679, filed on Dec. 10, 2018.

(51) Int. Cl.
*H04L 45/74*    (2022.01)
*H04W 72/04*    (2023.01)

(52) U.S. Cl.
CPC ............. *H04L 45/74* (2013.01); *H04W 72/04* (2013.01)

(58) Field of Classification Search
CPC ....... H04L 45/74; H04L 5/001; H04L 5/0098; H04W 72/04; H04W 80/02; H04W 16/28;
(Continued)

(56) References Cited

U.S. PATENT DOCUMENTS

2013/0195001 A1    8/2013  Liu
2017/0353887 A1   12/2017  Kim et al.
(Continued)

FOREIGN PATENT DOCUMENTS

WO    2018133840         7/2018
WO    WO 2019/028872 A1 *  2/2019

OTHER PUBLICATIONS

U.S. Appl. No. 62/629,702, filed 2018.*
PCT International Application No. PCT/KR2019/017346, International Search Report dated Apr. 27, 2020, 9 pages.

*Primary Examiner* — Rushil P. Sampat
(74) *Attorney, Agent, or Firm* — LEE, HONG, DEGERMAN, KANG & WAIMEY

(57) ABSTRACT

In the present disclosure, a transmitting device receives zero header information from a receiving device, generates a MAC PDU based on the zero header information, and transmits the MAC PDU. The zero header information may include information regarding a logical channel or MAC control element (CE). The MAC PDU may include a MAC subPDU containing data of the logical channel or the MAC CE without corresponding MAC subheader.

16 Claims, 15 Drawing Sheets

(58) Field of Classification Search
CPC . H04W 72/14; H04W 72/23; H04W 74/0833;
H04W 76/11; H04W 76/10; H04W 76/19;
H04W 76/27
See application file for complete search history.

(56) References Cited

U.S. PATENT DOCUMENTS

| | | | |
|---|---|---|---|
| 2018/0041922 A1 | 2/2018 | Chen et al. | |
| 2018/0103395 A1 | 4/2018 | Gholmieh et al. | |
| 2019/0254114 A1* | 8/2019 | Son | H04W 76/11 |
| 2020/0137826 A1* | 4/2020 | Liu | H04W 28/06 |
| 2020/0178308 A1* | 6/2020 | Chen | H04W 28/065 |
| 2020/0358577 A1* | 11/2020 | Takeda | H04L 5/0094 |
| 2020/0413435 A1* | 12/2020 | Chin | H04W 72/23 |

\* cited by examiner

FIG. 4
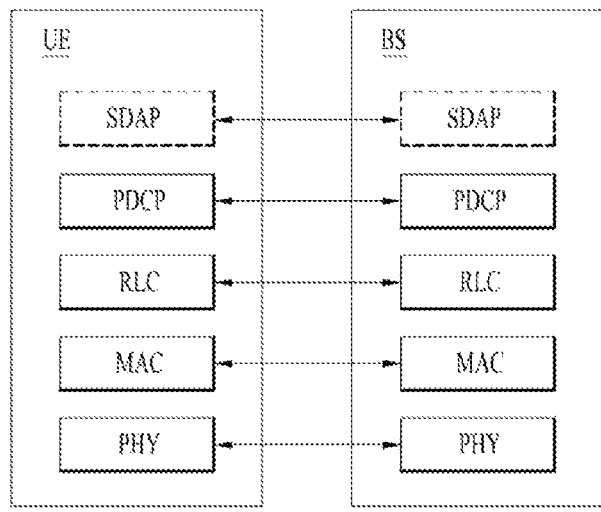
(a) User Plane Protocol Stack
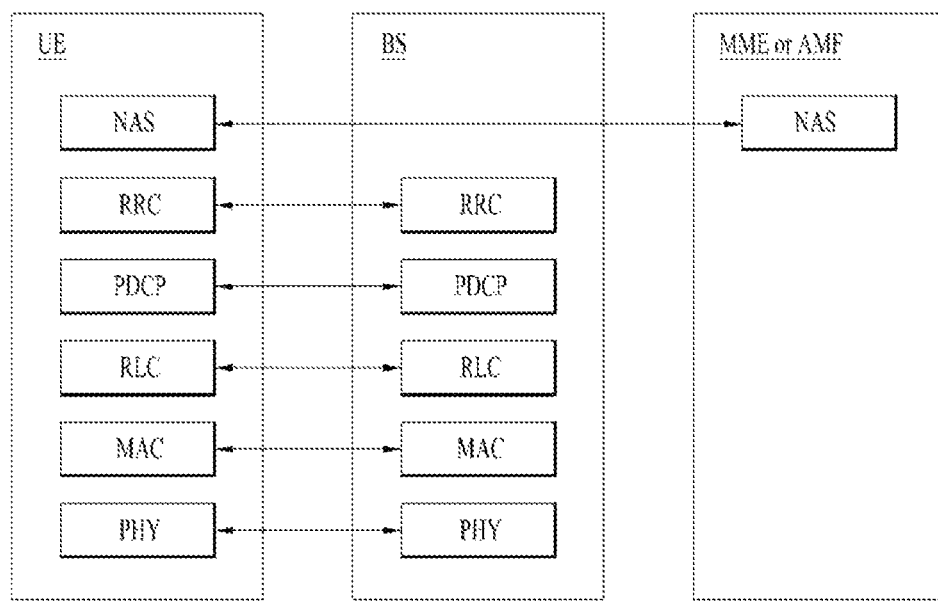
(b) Control Plane Protocol Stack

METHOD OF PERFORMING TRANSMISSION OF HEADERLESS DATA UNIT IN WIRELESS COMMUNICATION SYSTEM

CROSS-REFERENCE TO RELATED APPLICATIONS

This application is the National Stage filing under 35 U.S.C. 371 of International Application No. PCT/KR2019/017346, filed on Dec. 10, 2019, which claims the benefit of U.S. Provisional Application No. 62/777,679, filed on Dec. 10, 2018, the contents of which are all incorporated by reference herein in their entirety.

TECHNICAL FIELD

The present invention relates to a wireless communication system.

BACKGROUND ART

Introduction of new radio communication technologies has led to increases in the number of user equipments (UEs) to which a base station (BS) provides services in a prescribed resource region, and has also led to increases in the amount of data and control information that the BS transmits to the UEs. Due to typically limited resources available to the BS for communication with the UE(s), new techniques are needed by which the BS utilizes the limited radio resources to efficiently receive/transmit uplink/downlink data and/or uplink/downlink control information.

DISCLOSURE

Technical Problem

Various types of signals, including data signals and control signals, are communicated via the UL and DL. Scheduling of such communications is typically performed, to achieve improved efficiency, latency, and/or reliability. Overcoming delay or latency has become an important challenge in applications whose performance critically depends on delay/latency.

The technical objects that can be achieved through the present invention are not limited to what has been particularly described hereinabove and other technical objects not described herein will be more clearly understood by persons skilled in the art from the following detailed description.

Technical Solution

As an aspect of the present disclosure, provided herein is a method for transmitting, by a transmitting device, data units in a wireless communication system. The method comprises: receiving zero header information from a receiving device; generating a medium access control (MAC) protocol data unit (PDU) based on the zero header information; and transmitting the MAC PDU. The zero header information may include information regarding a logical channel or MAC control element (CE). The MAC PDU includes a MAC subPDU which includes data of the logical channel or the MAC CE, and includes no MAC subheader for the logical channel or the MAC CE.

As another aspect of the present disclosure, provided herein is a transmitting device for transmitting data units in a wireless communication system. The transmitting device comprises: a transceiver; at least one processor; and at least one computer memory operably connectable to the at least one processor and storing instructions that, when executed, cause the at least one processor to perform operations. The operations comprise: receiving, via the transceiver, zero header information from a receiving device; generating a medium access control (MAC) protocol data unit (PDU) based on the zero header information; and transmitting, via the transceiver, the MAC PDU. The MAC PDU includes a MAC subPDU which includes data of the logical channel or the MAC CE, and includes no MAC subheader for the logical channel or the MAC CE.

As a further aspect of the present disclosure, provided herein is a method for receiving, by a receiving device, data units in a wireless communication system. The method comprises: transmitting zero header information to a transmitting device; and receiving a medium access control (MAC) protocol data unit (PDU) based on the zero header information from the transmitting device. The MAC PDU includes a MAC subPDU which includes data of the logical channel or the MAC CE, and includes no MAC subheader for the logical channel or the MAC CE.

As a still further aspect of the present disclosure, provided herein is a receiving device for receiving data units in a wireless communication system. The receiving device comprises: a transceiver; at least one processor; and at least one computer memory operably connectable to the at least one processor and storing instructions that, when executed, cause the at least one processor to perform operations. The operations comprise: transmitting, via the transceiver, zero header information to a transmitting device; and receiving, via the transceiver, a medium access control (MAC) protocol data unit (PDU) based on the zero header information from the transmitting device. The MAC PDU includes a MAC subPDU which includes data of the logical channel or the MAC CE, and includes no MAC subheader for the logical channel or the MAC CE.

In each aspect of the present disclosure, the zero header information may be applied per logical channel, per MAC CE, per UL grant, per configured grant, per bandwidth part, per carrier, per cell, per MAC entity or per UE.

In each aspect of the present disclosure, the zero header information may be provided per logical channel, per MAC CE, per UL grant, per configured grant, per bandwidth part, per carrier, per cell, per MAC entity or per UE.

In each aspect of the present disclosure, the zero header information may include information regarding a duration during which the zero header information is valid.

In each aspect of the present disclosure, the zero header information may include an amount of data to be included for the logical channel in the MAC PDU.

In each aspect of the present disclosure, the zero header information may include information regarding a placement order of data of the logical channel or the MAC CE in the MAC PDU.

In each aspect of the present disclosure, based on remaining UL resources after assigning UL resources for the MAC subPDU with no MAC subheader, the transmitting device may assign the remaining UL resources to another MAC subPDU with a MAC subheader other than the MAC subPDU with no MAC subheader.

The above technical solutions are merely some parts of the implementations of the present disclosure and various implementations into which the technical features of the present disclosure are incorporated can be derived and understood by persons skilled in the art from the following detailed description of the present disclosure.

Advantageous Effects

In some scenarios, implementations of the present disclosure may provide one or more of the following advantages. In some scenarios, radio communication signals can be more efficiently transmitted and/or received. Therefore, overall throughput of a radio communication system can be improved.

According to some implementations of the present disclosure, delay/latency occurring during communication between a user equipment and a BS may be reduced.

Also, signals in a new radio access technology system can be transmitted and/or received more effectively.

It will be appreciated by persons skilled in the art that the effects that can be achieved through the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the invention, illustrate embodiments of the invention and together with the description serve to explain the principle of the invention:

FIG. 4 illustrates an example of protocol stacks in a third generation partnership project (3GPP) based wireless communication system;

MODE FOR INVENTION

Figure 1:
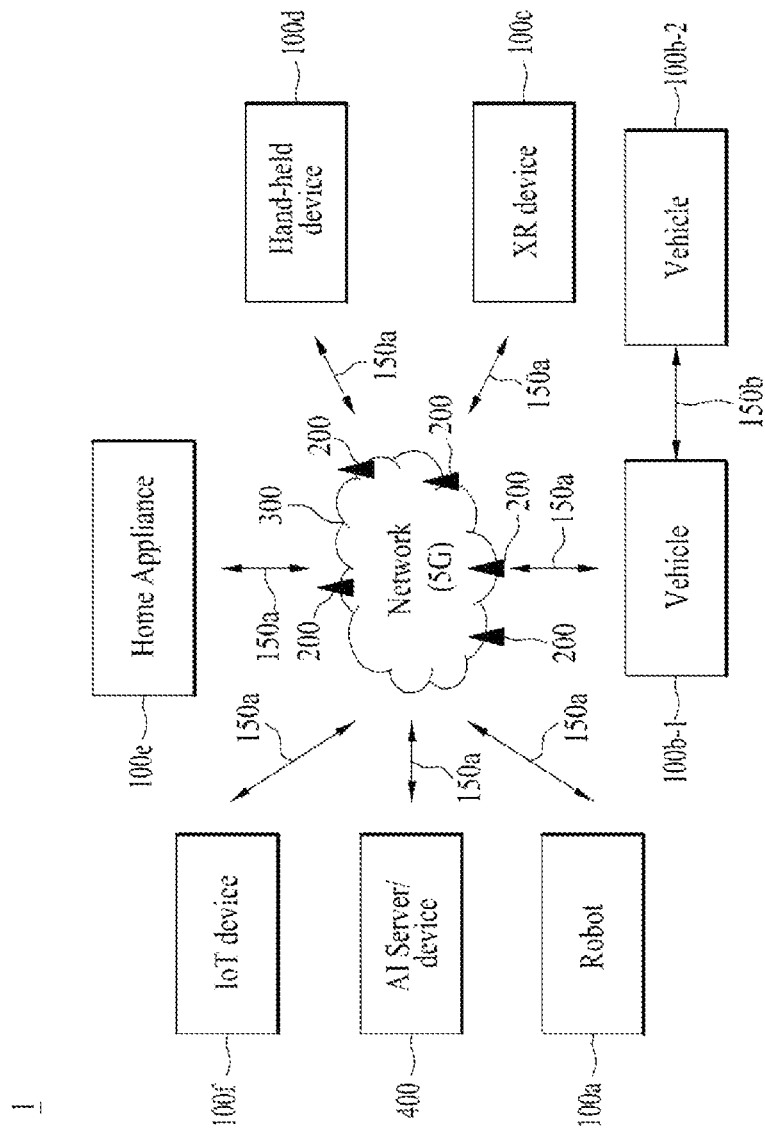
FIG. 1 illustrates an example of a communication system 1 to which implementations of the present disclosure is applied.

Reference will now be made in detail to the exemplary implementations of the present disclosure, examples of which are illustrated in the accompanying drawings. The detailed description, which will be given below with reference to the accompanying drawings, is intended to explain exemplary implementations of the present disclosure, rather than to show the only implementations that can be implemented according to the disclosure. The following detailed description includes specific details in order to provide a thorough understanding of the present disclosure. However, it will be apparent to those skilled in the art that the present disclosure may be practiced without such specific details.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced. For example, the following documents may be referenced.

3GPP LTE
3GPP TS 36.211: Physical channels and modulation
3GPP TS 36.212: Multiplexing and channel coding
3GPP TS 36.213: Physical layer procedures
3GPP TS 36.214: Physical layer; Measurements
3GPP TS 36.300: Overall description 3GPP TS 36.304: User Equipment (UE) procedures in idle mode
3GPP TS 36.314: Layer 2—Measurements
3GPP TS 36.321: Medium Access Control (MAC) protocol
3GPP TS 36.322: Radio Link Control (RLC) protocol
3GPP TS 36.323: Packet Data Convergence Protocol (PDCP)
3GPP TS 36.331: Radio Resource Control (RRC) protocol
3GPP NR (e.g. 5G)
3GPP TS 38.211: Physical channels and modulation
3GPP TS 38.212: Multiplexing and channel coding
3GPP TS 38.213: Physical layer procedures for control
3GPP TS 38.214: Physical layer procedures for data
3GPP TS 38.215: Physical layer measurements
3GPP TS 38.300: Overall description
3GPP TS 38.304: User Equipment (UE) procedures in idle mode and in RRC inactive state
3GPP TS 38.321: Medium Access Control (MAC) protocol
3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)
3GPP TS 37.340: Multi-connectivity; Overall description In the present disclosure, a user equipment (UE) may be a fixed or mobile device. Examples of the UE include various devices that transmit and receive user data and/or various kinds of control information to and from a base station (BS). In the present disclosure, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Especially, a BS of the UMTS is referred to as a NB, a BS of the enhanced packet core (EPC)/long term evolution (LTE) system is referred to as an eNB, and a BS of the new radio (NR) system is referred to as a gNB.

In the present disclosure, a node refers to a point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be a BS. For example, the node may be a radio remote head (RRH) or a radio remote unit (RRU). The RRH or RRU generally has a lower power level than a power level of a BS. Since the RRH or RRU (hereinafter, RRH/RRU) is generally connected to the BS through a dedicated line such as an optical cable, cooperative communication between RRH/RRU and the BS can be smoothly performed in comparison with cooperative communication between BSs connected by a radio line. At least one antenna is installed per node. The antenna may include a physical antenna or an antenna port or a virtual antenna.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and an uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In the present disclosure, a physical downlink control channel (PDCCH), and a physical downlink shared channel (PDSCH) refer to a set of time-frequency resources or resource elements (REs) carrying downlink control information (DCI), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. In the present disclosure, for dual connectivity (DC) operation, the term "special Cell" refers to the PCell of the master cell group (MCG) or the PSCell of the secondary cell group (SCG), and otherwise the term Special Cell refers to the PCell. An SpCell supports physical uplink control channel (PUCCH) transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with DC. For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells.

The MCG is a group of serving cells associated with a master BS which terminates at least S1-MME, and the SCG is a group of serving cells associated with a secondary BS that is providing additional radio resources for the UE but is not the master BS. The SCG includes a primary SCell (PSCell) and optionally one or more SCells. In DC, two MAC entities are configured in the UE: one for the MCG and one for the SCG. Each MAC entity is configured by RRC with a serving cell supporting PUCCH transmission and contention based Random Access. In the present disclosure, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present disclosure, monitoring a channel refers to attempting to decode the channel. For example, monitoring a physical downlink control channel (PDCCH) refers to attempting to decode PDCCH(s) (or PDCCH candidates).

In the present disclosure, "C-RNTI" refers to a cell RNTI, "SI-RNTI" refers to a system information RNTI, "P-RNTI" refers to a paging RNTI, "RA-RNTI" refers to a random access RNTI, "SC-RNTI" refers to a single cell RNTI", "SL-RNTI" refers to a sidelink RNTI, "SPS C-RNTI" refers to a semi-persistent scheduling C-RNTI, and "CS-RNTI" refers to a configured scheduling RNTI.

FIG. 1 illustrates an example of a communication system 1 to which implementations of the present disclosure is applied.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g. e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices, base stations (BSs), and a network. Although FIG. 1 illustrates a 5G network as an example of the network of the communication system 1, the implementations of the present disclosure are not limited to the 5G system, and can be applied to the future communication system beyond the 5G system.

The BSs and the network may be implemented as wireless devices and a specific wireless device 200a may operate as a BS/network node with respect to other wireless devices.

The wireless devices represent devices performing communication using radio access technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. The vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The handheld device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A user equipment (UE) may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an unmanned aerial vehicle (UAV), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or a financial device), a security device, a weather/environment device, a device related to a 5G service, or a device related to a fourth industrial revolution field. The unmanned aerial vehicle (UAV) may be, for example, an aircraft aviated by a wireless control signal without a human being onboard. The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet. The public safety device may include, for example, an image relay device or an image device that is wearable on the body of a user. The MTC device and the IoT device may be, for example, devices that do not require direct human intervention or manipulation. For example, the MTC device and the IoT device may include smartmeters, vending machines, thermometers, smartbulbs, door locks, or various sensors. The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure. The security device may be, for example, a device installed to prevent a danger that may arise and to maintain safety. For example, the security device may be a camera, a CCTV, a recorder, or a black box. The FinTech device may be, for example, a device capable of providing a financial service such as mobile payment. For example, the FinTech device may include a payment device or a point of sales (POS) system. The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f/BS 200-BS 200. Herein, the wireless communication/connections may be established through various RATs (e.g., 5G NR) such as uplink/downlink communication 150a and sidelink communication 150b (or D2D communication). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
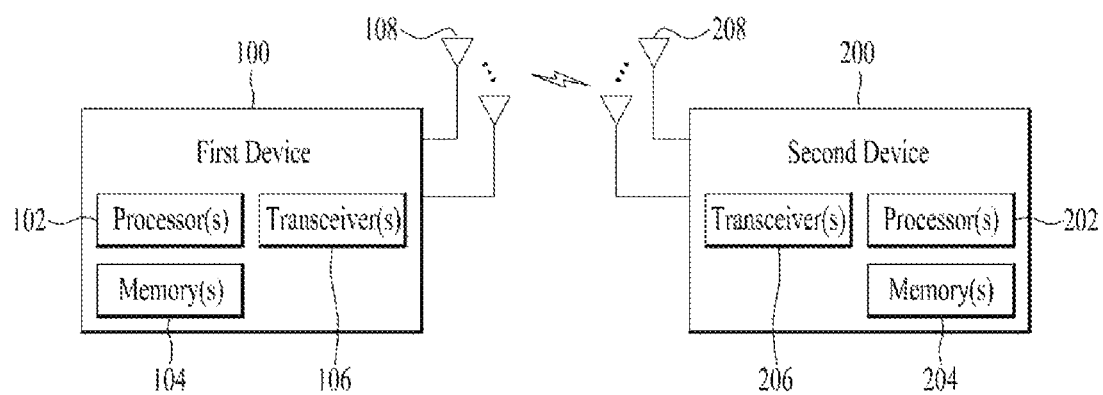
FIG. 2 is a block diagram illustrating examples of communication devices which can perform a method according to the present disclosure.

FIG. 2 is a block diagram illustrating examples of communication devices which can perform a method according to the present disclosure.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to {the wireless device 100a to 100f and the BS 200} and/or {the wireless device 100a to 100f and the wireless device 100a to 100f} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the functions, procedures, and/or methods described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the procedures and/or methods described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present invention, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the functions, procedures, and/or methods described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the procedures and/or methods described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present invention, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The functions, procedures, proposals, and/or methods disclosed in the present disclosure may be implemented using firmware or software and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In some implementations of the present disclosure, a UE may operate as a transmitting device in uplink (UL) and as a receiving device in downlink (DL). In some implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS, unless otherwise mentioned or described. For example, the processor(s) 102 connected to, mounted on or launched in the first wireless device 100 may be configured to perform the UE behaviour according to an implementation of the present disclosure or control the transceiver(s) 106 to perform the UE behaviour according to an implementation of the present disclosure. The processor(s) 202 connected to, mounted on or launched in the second wireless device 200 may be configured to perform the BS behaviour according to an implementation of the present disclosure or control the transceiver(s) 206 to perform the BS behaviour according to an implementation of the present disclosure.

Figure 3:
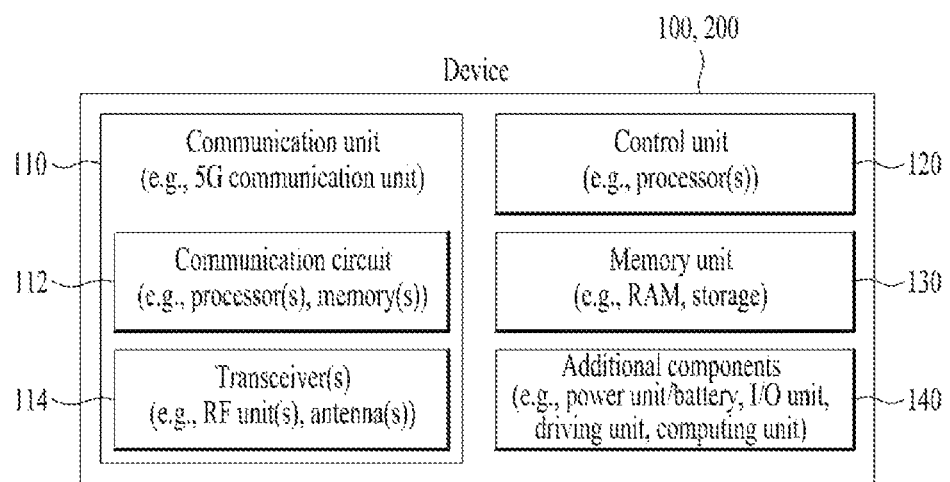
FIG. 3 illustrates another example of a wireless device which can perform implementations of the present invention.

FIG. 3 illustrates another example of a wireless device which can perform implementations of the present invention. The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit (e.g. audio I/O port, video I/O port), a driving unit, and a computing unit. The wireless device may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a Fintech device (or a finance device), a security device, a climate/environment device, the AI server/device (400 of FIG. 1), the BSs (200 of FIG. 1), a network node, etc. The wireless device may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read only memory (ROM)), a flash memory, a volatile memory, a non-volatile memory, and/or a combination thereof.

FIG. 4 illustrates an example of protocol stacks in a 3GPP based wireless communication system.

In particular, FIG. 4(*a*) illustrates an example of a radio interface user plane protocol stack between a UE and a base station (BS) and FIG. 4(*b*) illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 4(*a*), the user plane protocol stack may be divided into a first layer (Layer 1) (i.e., a physical (PHY) layer) and a second layer (Layer 2). Referring to FIG. 4(*b*), the control plane protocol stack may be divided into Layer 1 (i.e., a PHY layer), Layer 2, Layer 3 (e.g., a radio resource control (RRC) layer), and a non-access stratum (NAS) layer. Layer 1, Layer 2 and Layer 3 are referred to as an access stratum (AS).

The NAS control protocol is terminated in an access management function (AMF) on the network side, and performs functions such as authentication, mobility management, security control and etc.

In the 3GPP LTE system, the layer 2 is split into the following sublayers: medium access control (MAC), radio link control (RLC), and packet data convergence protocol (PDCP). In the 3GPP New Radio (NR) system, the layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G Core Network quality of service (QoS) flows.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5G core (5GC) or NG-RAN; establishment, maintenance and release of an RRC connection between the UE and NG-RAN; security functions including key management; establishment, configuration, maintenance and release of signalling radio bearers (SRBs) and data radio bearers (DRBs); mobility functions (including: handover and context transfer; UE cell selection and reselection and control of cell selection and reselection; Inter-RAT mobility); QoS management functions; UE measurement reporting and control of the reporting; detection of and recovery from radio link failure; NAS message transfer to/from NAS from/to UE.

In the 3GPP NR system, the main services and functions of the PDCP sublayer for the user plane include: sequence numbering; header compression and decompression: ROHC only; transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

The RLC sublayer supports three transmission modes: Transparent Mode (TM); Unacknowledged Mode (UM); and Acknowledged Mode (AM). The RLC configuration is per logical channel with no dependency on numerologies and/or transmission durations. In the 3GPP NR system, the main services and functions of the RLC sublayer depend on the transmission mode and include: Transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the MAC sublayer include: mapping between logical channels and transport channels; multiplexing/demultiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use. Different kinds of data transfer services are offered by MAC. To accommodate different kinds of data transfer services, multiple types of logical channels are defined i.e. each supporting transfer of a particular type of information. Each logical channel type is defined by what type of information is transferred. Logical channels are classified into two groups: Control Channels and Traffic Channels. Control channels are used for the transfer of control plane information only, and traffic channels are used for the transfer of user plane information only. Broadcast Control Channel (BCCH) is a downlink logical channel for broadcasting system control information, paging Control Channel (PCCH) is a downlink logical channel that transfers paging information, system information change notifications and indications of ongoing PWS broadcasts, Common Control Channel (CCCH) is a logical channel for transmitting control information between UEs and network and used for UEs having no RRC connection with the network, and Dedicated Control Channel (DCCH) is a point-to-point bi-directional logical channel that transmits dedicated control information between a UE and the network and used by UEs having an RRC connection. Dedicated Traffic Channel (DTCH) is a point-to-point logical channel, dedicated to one UE, for the transfer of user information. A DTCH can exist in both uplink and downlink. In Downlink, the following connections between logical channels and transport channels exist: BCCH can be mapped to BCH; BCCH can be mapped to downlink shared channel (DL-SCH); PCCH can be mapped to PCH; CCCH can be mapped to DL-SCH; DCCH can be mapped to DL-SCH; and DTCH can be mapped to DL-SCH. In Uplink, the following connections between logical channels and transport channels exist: CCCH can be mapped to uplink shared channel (UL-SCH); DCCH can be mapped to UL-SCH; and DTCH can be mapped to UL-SCH.

Figure 5:
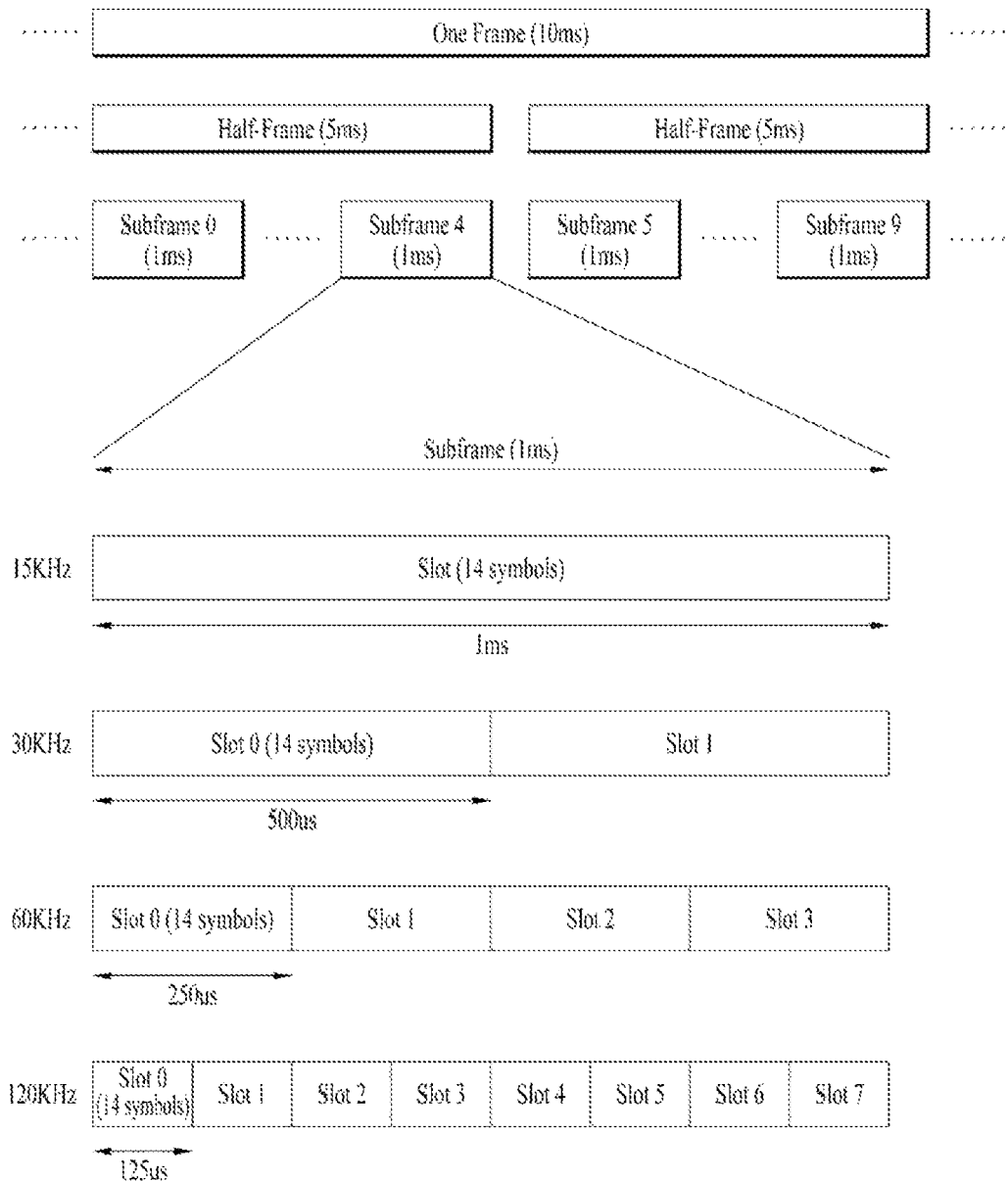
FIG. 5 illustrates an example of a frame structure in a 3GPP based wireless communication system.

FIG. 5 illustrates an example of a frame structure in a 3GPP based wireless communication system.

The frame structure illustrated in FIG. 5 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 5, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz. The following table shows the number of OFDM symbols per slot, the number of slots per frame, and the number of slots per for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g. radio resource control (RRC) signaling), where $N^{grid,x}_{size,u}$ is the number of resource blocks in the resource grid and the subscript x is DL for downlink and UL for uplink. $N^{RB}_{sc}$ is the number of subcarriers per resource blocks. In the 3GPP based wireless communication system, $N^{RB}_{sc}$ is 12 generally. There is one resource grid for a given antenna portp, subcarrier spacing configuration u, and transmission direction (DL or UL). The carrier bandwidth $N^{size,u}_{grid}$ for subcarrier spacing configuration u is given by the higher-layer parameter (e.g. RRC parameter). Each element in the resource grid for the antenna portp and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, a resource block is defined by 12 consecutive subcarriers in the frequency domain. In the 3GPP NR system, resource blocks are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive resource blocks. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

NR frequency bands are defined as 2 types of frequency range, FR1 and FR2. FR2 is may also called millimeter wave (mmW). The frequency ranges in which NR can operate are identified as described in Table 3.

TABLE 3

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 6:
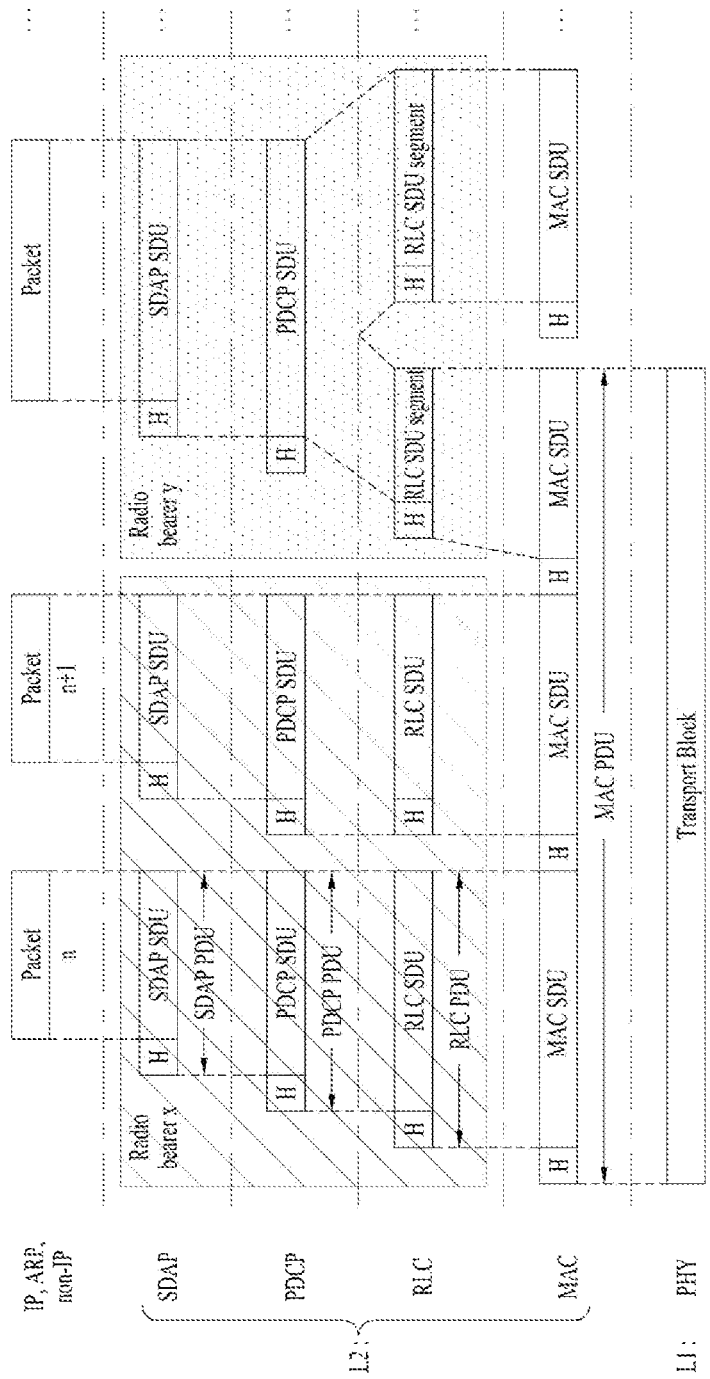
FIG. 6 illustrates a data flow example in the 3GPP new radio (NR) system.

FIG. 6 illustrates a data flow example in the 3GPP NR system. In FIG. 6, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to physical uplink shared channel (PUSCH) and physical random access channel (PRACH), respectively, and the downlink transport channels DL-SCH, BCH and PCH are mapped to physical downlink shared channel (PDSCH), physical broad cast channel (PBCH) and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

In order to transmit data unit(s) of the present disclosure on UL-SCH, a UE shall have uplink resources available to the UE. In order to receive data unit(s) of the present disclosure on DL-SCH, a UE shall have downlink resources available to the UE. The resource allocation includes time domain resource allocation and frequency domain resource allocation. In the present disclosure, uplink resource allocation is also referred to as uplink grant, and downlink resource allocation is also referred to as downlink assignment. An uplink grant is either received by the UE dynamically on PDCCH, in a Random Access Response, or configured to the UE semi-persistently by RRC. Downlink assignment is either received by the UE dynamically on the PDCCH, or configured to the UE semi-persistently by RRC signaling from the BS.

In UL, the BS can dynamically allocate resources to UEs via the Cell Radio Network Temporary Identifier (C-RNTI) on PDCCH(s). A UE always monitors the PDCCH(s) in order to find possible grants for uplink transmission when its downlink reception is enabled (activity governed by discontinuous reception (DRX) when configured). In addition, with Configured Grants, the BS can allocate uplink resources for the initial HARQ transmissions to UEs. Two types of configured uplink grants are defined: Type 1 and Type 2. With Type 1, RRC directly provides the configured uplink grant (including the periodicity). With Type 2, RRC defines the periodicity of the configured uplink grant while PDCCH addressed to Configured Scheduling RNTI (CS-RNTI) can either signal and activate the configured uplink grant, or deactivate it; i.e. a PDCCH addressed to CS-RNTI indicates that the uplink grant can be implicitly reused according to the periodicity defined by RRC, until deactivated.

In DL, the BS can dynamically allocate resources to UEs via the C-RNTI on PDCCH(s). A UE always monitors the PDCCH(s) in order to find possible assignments when its downlink reception is enabled (activity governed by DRX when configured). In addition, with Semi-Persistent Scheduling (SPS), the BS can allocate downlink resources for the initial HARQ transmissions to UEs: RRC defines the periodicity of the configured downlink assignments while PDCCH addressed to CS-RNTI can either signal and activate the configured downlink assignment, or deactivate it. In other words, a PDCCH addressed to CS-RNTI indicates that the downlink assignment can be implicitly reused according to the periodicity defined by RRC, until deactivated.

Resource Allocation by PDCCH (i.e. Resource Allocation by DCI)

PDCCH can be used to schedule DL transmissions on PDSCH and UL transmissions on PUSCH, where the downlink control information (DCI) on PDCCH includes: downlink assignments containing at least modulation and coding format (e.g., modulation and coding scheme (MCS) index $I_{MCS}$), resource allocation, and hybrid-ARQ information related to DL-SCH; or uplink scheduling grants containing at least modulation and coding format, resource allocation, and hybrid-ARQ information related to UL-SCH. The size and usage of the DCI carried by one PDCCH are varied depending on DCI formats. For example, in the 3GPP NR system, DCI format 0_0 or DCI format 0_1 is used for scheduling of PUSCH in one cell, and DCI format 1_0 or DCI format 1_1 is used for scheduling of PDSCH in one cell.

Figure 7:
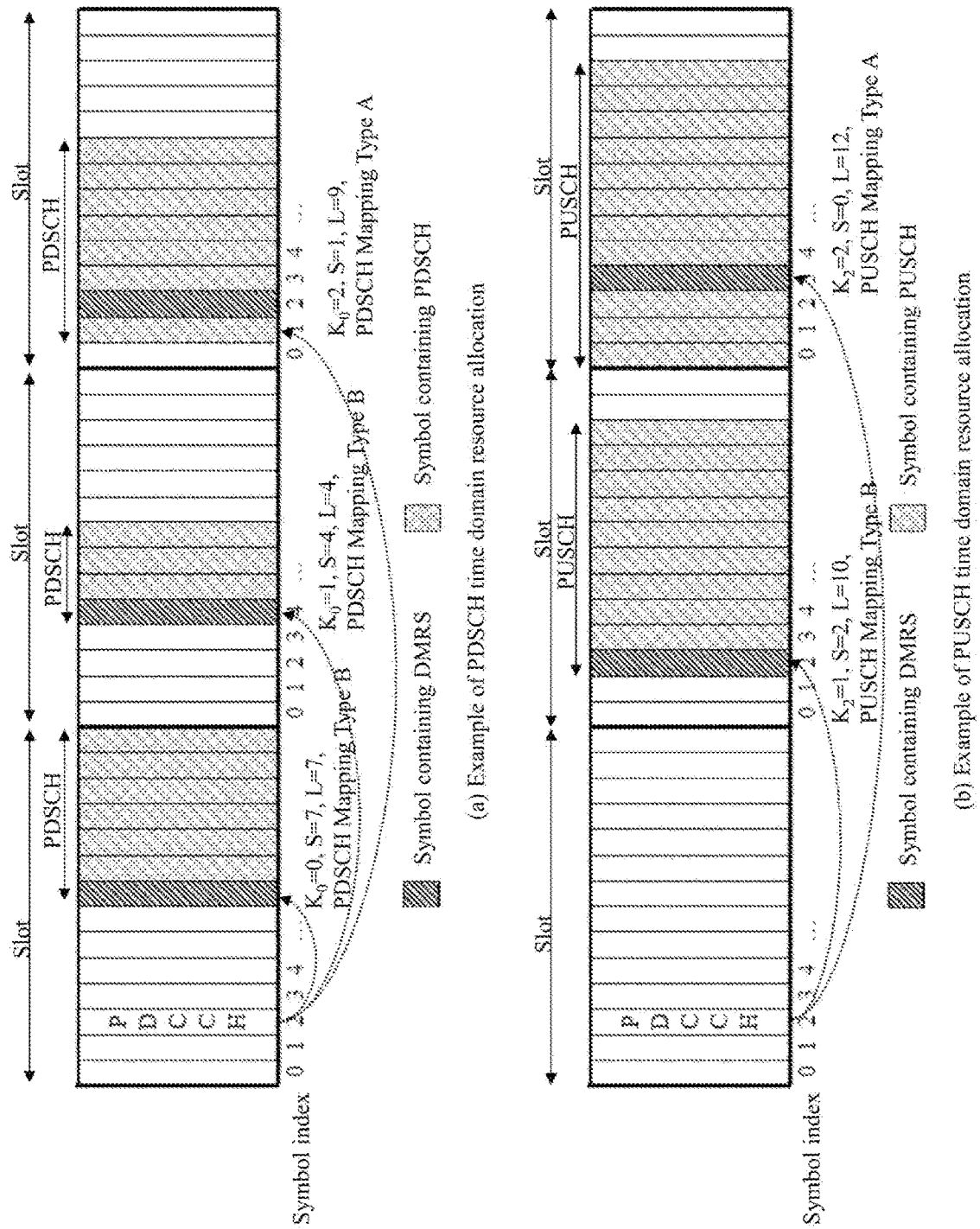
FIG. 7 illustrates an example of physical downlink shared channel (PDSCH) time domain resource allocation by physical downlink control channel (PDCCH), and an example of physical uplink shared channel (PUSCH) time resource allocation by PDCCH.

FIG. 7 illustrates an example of PDSCH time domain resource allocation by PDCCH, and an example of PUSCH time resource allocation by PDCCH.

Downlink control information (DCI) carried by a PDCCH for scheduling PDSCH or PUSCH includes a value m for a row index m+1 to an allocation table for PDSCH or PUSCH. Either a predefined default PDSCH time domain allocation A, B or C is applied as the allocation table for PDSCH, or RRC configured pdsch-TimeDomainAllocationList is applied as the allocation table for PDSCH. Either a predefined default PUSCH time domain allocation A is applied as the allocation table for PUSCH, or the RRC configured pusch-TimeDomainAllocationList is applied as the allocation table for PUSCH. Which PDSCH time domain resource allocation configuration to apply and which PUSCH time domain resource allocation table to apply are determined according to a fixed/predefined rule (e.g. Table 5.1.2.1.1-1 in 3GPP TS 38.214 v15.3.0, Table 6.1.2.1.1-1 in 3GPP TS 38.214 v15.3.0).

Each indexed row in PDSCH time domain allocation configurations defines the slot offset $K_0$, the start and length indicator SLIV, or directly the start symbol S and the allocation length L, and the PDSCH mapping type to be assumed in the PDSCH reception. Each indexed row in PUSCH time domain allocation configurations defines the slot offset $K_2$, the start and length indicator SLIV, or directly the start symbol S and the allocation length L, and the PUSCH mapping type to be assumed in the PUSCH reception. $K_0$ for PDSCH, or $K_2$ for PUSCH is the timing difference between a slot with a PDCCH and a slot with PDSCH or PUSCH corresponding to the PDCCH. SLIV is a joint indication of starting symbol S relative to the start of the slot with PDSCH or PUSCH, and the number L of consecutive symbols counting from the symbol S. For PDSCH/PUSCH mapping type, there are two mapping types: one is Mapping Type A where demodulation reference signal (DMRS) is positioned in $3^{rd}$ or $4^{th}$ symbol of a slot depending on the RRC signaling, and other one is Mapping Type B where DMRS is positioned in the first allocated symbol.

The scheduling DCI includes the Frequency domain resource assignment field which provides assignment information on resource blocks used for PDSCH or PUSCH. For example, the Frequency domain resource assignment field may provide a UE with information on a cell for PDSCH or PUSCH transmission, information on a bandwidth part for PDSCH or PUSCH transmission, information on resource blocks for PDSCH or PUSCH transmission.

Resource Allocation by RRC

As mentioned above, in uplink, there are two types of transmission without dynamic grant: configured grant Type 1 where an uplink grant is provided by RRC, and stored as configured grant; and configured grant Type 2 where an uplink grant is provided by PDCCH, and stored or cleared as configured uplink grant based on L1 signaling indicating configured uplink grant activation or deactivation. Type 1 and Type 2 are configured by RRC per serving cell and per BWP. Multiple configurations can be active simultaneously only on different serving cells. For Type 2, activation and deactivation are independent among the serving cells. For the same serving cell, the MAC entity is configured with either Type 1 or Type 2.

A UE is provided with at least the following parameters via RRC signaling from a BS when the configured grant type 1 is configured:
  cs-RNTI which is CS-RNTI for retransmission;
  periodicity which provides periodicity of the configured grant Type 1;
  timeDomainOffset which represents offset of a resource with respect to SFN=0 in time domain;
  timeDomainAllocation value m which provides a row index m+1 pointing to an allocation table, indicating a combination of a start symbol S and length L and PUSCH mapping type;
  frequencyDomainAllocation which provides frequency domain resource allocation; and
  mcsAndTBS which provides mcs representing the modulation order, target code rate and transport block size. Upon configuration of a configured grant Type 1 for a serving cell by RRC, the UE stores the uplink grant provided by RRC as a configured uplink grant for the indicated serving cell, and initialise or re-initialise the configured uplink grant to start in the symbol according to timeDomainOffset and S (derived from SLIV), and to reoccur with periodicity. After an uplink grant is configured for a configured grant Type 1, the UE considers that the uplink grant recurs associated with each symbol for which: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+N*periodicity) modulo (1024*numberOfSlotsPerFrame*numberOfSymbolsPerSlot), for all N>=0.

A UE is provided with at least the following parameters via RRC signaling from a BS when the configured gran Type 2 is configured:
  cs-RNTI which is CS-RNTI for activation, deactivation, and retransmission; and
  periodicity which provides periodicity of the configured grant Type 2. The actual uplink grant is provided to the UE by the PDCCH (addressed to CS-RNTI). After an uplink grant is configured for a configured grant Type 2, the UE considers that the uplink grant recurs associated with each symbol for which: [(SFN*numberOfSlotsPerFrame*numberOfSymbolsPerSlot)+(slot number in the frame*numberOfSymbolsPerSlot)+symbol number in the slot]=[(SFN$_{start\ time}$*numberOfSlotsPerFrame*numberOfSymbolsPerSlot+slot$_{start\ time}$*numberOfSymbolsPerSlot+symbol$_{start\ time}$)+N*periodicity] modulo (1024*numberOfSlotsPerFrame*numberOfSymbolsPerSlot), for all N>=0, where SFN$_{start\ time}$, slot$_{start\ time}$, and symbol$_{start\ time}$ are the SFN, slot, and symbol, respectively, of the first transmission opportunity of PUSCH where the configured uplink grant was (re-)initialised. numberOfSlotsPerFrame and numberOfSymbolsPerSlot refer to the number of consecutive slots per frame and the number of consecutive OFDM symbols per slot, respectively (see Table 1 and Table 2).

For configured uplink grants, the HARQ Process ID associated with the first symbol of a UL transmission is derived from the following equation:

HARQ Process ID=[floor(CURRENT_symbol/periodicity)]modulo nrofHARQ-Processes where CURRENT_symbol=(SFN*numberOfSlotsPerFrame*numberOfSymbolsPerSlot+slot number in the frame*numberOfSymbolsPerSlot+symbol number in the slot), and numberOfSlotsPerFrame and numberOfSymbolsPerSlot refer to the number of consecutive slots per frame and the number of consecutive symbols per slot, respectively as specified in TS 38.211. CURRENT_symbol refers to the symbol index of the first transmission occasion of a repetition bundle that takes place. A HARQ process is configured for a configured uplink grant if the configured uplink grant is activated and the associated HARQ process ID is less than nrofHARQ-Processes.

For downlink, a UE may be configured with semi-persistent scheduling (SPS) per serving cell and per BWP by RRC signaling from a BS. Multiple configurations can be active simultaneously only on different serving cells. Activation and deactivation of the DL SPS are independent among the serving cells. For DL SPS, a DL assignment is provided to the UE by PDCCH, and stored or cleared based on L1 signaling indicating SPS activation or deactivation. A UE is provided with the following parameters via RRC signaling from a BS when SPS is configured:

cs-RNTI which is CS-RNTI for activation, deactivation, and retransmission;

nrofHARQ-Processes: which provides the number of configured HARQ processes for SPS;

periodicity which provides periodicity of configured downlink assignment for SPS. When SPS is released by upper layers, all the corresponding configurations shall be released.

After a downlink assignment is configured for SPS, the UE considers sequentially that the $N^{th}$ downlink assignment occurs in the slot for which: (numberOfSlotsPerFrame*SFN+slot number in the frame)= [(numberOfSlotsPerFrame*SFN$_{start\ time}$+slot$_{start\ time}$)+ N*periodicity*numberOfSlotsPerFrame/10]modulo (1024*numberOfSlotsPerFrame), where SFN$_{start\ time}$ and slot$_{start\ time}$ are the SFN and slot, respectively, of the first transmission of PDSCH where the configured downlink assignment was (re-)initialised.

For configured downlink assignments, the HARQ Process ID associated with the slot where the DL transmission starts is derived from the following equation:

HARQ Process ID=[floor(CURRENT slot*10/
    (numberOfSlotsPerFrame*periodicity))]modulo
    nrofHARQ-Processes where CURRENT slot=[(SFN*numberOfSlotsPerFrame)+slot number in the frame] and numberOfSlotsPerFrame refers to the number of consecutive slots per frame as specified in TS 38.211.

A UE validates, for scheduling activation or scheduling release, a DL SPS assignment PDCCH or configured UL grant type 2 PDCCH if the cyclic redundancy check (CRC) of a corresponding DCI format is scrambled with CS-RNTI provided by the RRC parameter cs-RNTI and the new data indicator field for the enabled transport block is set to 0. Validation of the DCI format is achieved if all fields for the DCI format are set according to Table 4 or Table 5. Table 4 shows special fields for DL SPS and UL grant Type 2 scheduling activation PDCCH validation, and Table 5 shows special fields for DL SPS and UL grant Type 2 scheduling release PDCCH validation.

TABLE 4

|  | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 5

|  | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and actual UL grant, and the corresponding modulation and coding scheme are provided by the resource assignment fields (e.g. time domain resource assignment field which provides Time domain resource assignment value m, frequency domain resource assignment field which provides the frequency resource block allocation, modulation and coding scheme field) in the DCI format carried by the DL SPS and UL grant Type 2 scheduling activation PDCCH. If validation is achieved, the UE considers the information in the DCI format as valid activation or valid release of DL SPS or configured UL grant Type 2. The MAC entity includes a HARQ entity for each Serving Cell with configured uplink (including the case when it is configured with supplementaryUplink), which maintains a number of parallel HARQ processes. Each HARQ process supports one transport block (TB). Each HARQ process is associated with a HARQ process identifier. Each HARQ process is associated with a HARQ buffer.

For each uplink grant, the HARQ entity identifies the HARQ process associated with this grant. For each identified HARQ process, the HARQ entity obtains the MAC PDU to transmit from the Msg3 buffer if there is a MAC PDU in the Msg3 buffer and the uplink grant was received in a Random Access Response, and obtains the MAC PDU to transmit from the Multiplexing and assembly entity, if any, otherwise. If a MAC PDU to transmit has been obtained, the HARQ entity delivers the MAC PDU and the uplink grant and the HARQ information of the TB to the identified HARQ process, and instructs the identified HARQ process to trigger a new transmission.

The Logical Channel Prioritization (LCP) procedure is applied whenever a new transmission is performed. RRC controls the scheduling of uplink data by signalling for each logical channel per MAC entity:

priority where an increasing priority value indicates a lower priority level;

prioritisedBitRate which sets the Prioritized Bit Rate (PBR);

bucketSizeDuration which sets the Bucket Size Duration (BSD).

RRC additionally controls the LCP procedure by configuring mapping restrictions for each logical channel:

allowedSCS-List which sets the allowed Subcarrier Spacing(s) for transmission;

maxPUSCH-Duration which sets the maximum PUSCH duration allowed for transmission;

configuredGrantType1Allowed which sets whether a configured grant Type 1 can be used for transmission;

allowedServingCells which sets the allowed cell(s) for transmission.

The UE variable Bj which is maintained for each logical channel j is used for the Logical channel prioritization procedure. The MAC entity initializes Bj of the logical channel to zero when the logical channel is established. For each logical channel j, the MAC entity shall:

1> increment Bj by the product PBR*T before every instance of the LCP procedure, where T is the time elapsed since Bj was last incremented;

1> if the value of Bj is greater than the bucket size (i.e. PBR*BSD):

2>> set Bj to the bucket size.

The MAC entity shall, when a new transmission is performed:

1> select the logical channels for each UL grant that satisfy all the following conditions:

2>> the set of allowed Subcarrier Spacing index values in allowedSCS-List, if configured, includes the Subcarrier Spacing index associated to the UL grant; and 2>> maxPUSCH-Duration, if configured, is larger than or equal to the PUSCH transmission duration associated to the UL grant; and 2>> configuredGrantType1Allowed, if configured, is set to TRUE in case the UL grant is a Configured Grant Type 1; and 2>> allowedServingCells, if configured, includes the Cell information associated to the UL grant. Does not apply to logical channels associated with a DRB configured with PDCP duplication for which PDCP duplication is deactivated.

The Subcarrier Spacing index, PUSCH transmission duration and Cell information are included in Uplink transmission information received from lower layers (e.g. PHY) for the corresponding scheduled uplink transmission.

The MAC entity shall, when a new transmission is performed:

1> allocate resources to the logical channels as follows:

2>> logical channels selected as described above for the UL grant with Bj>0 are allocated resources in a decreasing priority order. If the PBR of a logical channel is set to "infinity", the MAC entity shall allocate resources for all the data that is available for transmission on the logical channel before meeting the PBR of the lower priority logical channel(s);

2>> decrement Bj by the total size of MAC SDUs served to logical channel j above;

2>> if any resources remain, all the logical channels selected as described above are served in a strict decreasing priority order (regardless of the value of Bj) until either the data for that logical channel or the UL grant is exhausted, whichever comes first. Logical channels configured with equal priority should be served equally.

Logical channels are prioritised in accordance with the predefined order, e.g., the following order (highest priority listed first):

C-RNTI MAC control element (CE) or data from UL-CCCH;

Configured Grant Confirmation MAC CE;

MAC CE for buffer status report (BSR), with exception of BSR included for padding;

Single Entry power headroom report (PHR) MAC CE or Multiple Entry PHR MAC CE;

data from any Logical Channel, except data from UL-CCCH;

MAC CE for Recommended bit rate query;

MAC CE for BSR included for padding.

The MAC entity shall multiplex MAC CEs and MAC SDUs in a MAC PDU according to the logical channel prioritization and the MAC PDU structure.

Figure 8:
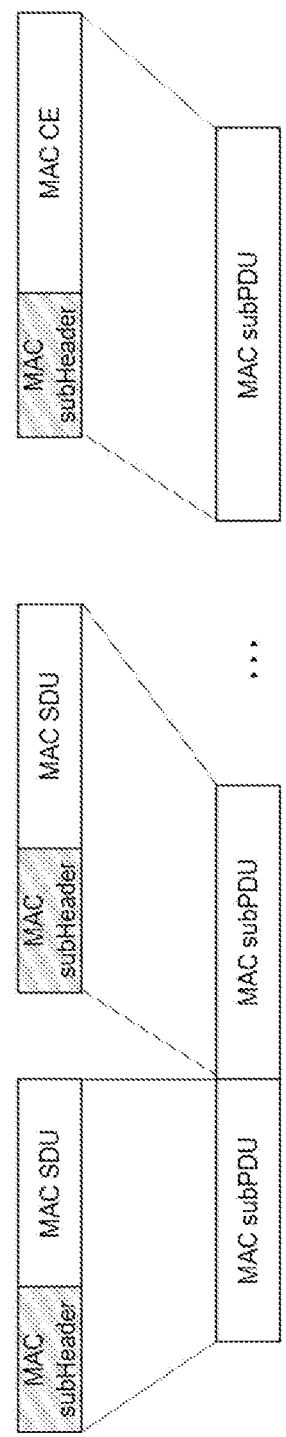
FIG. 8 illustrates an example of medium access control (MAC) protocol data unit (PDU)

FIG. 8 illustrates an example of MAC PDU. In FIG. 8, each MAC subPDU always includes corresponding MAC subheader.

Referring to FIG. 8, a MAC PDU consists of one or more MAC subPDUs. Each MAC subPDU consists of one of the following: i) a MAC subheader only (including padding); ii) a MAC subheader and a MAC SDU; iii) a MAC subheader and a MAC CE; iv) a MAC subheader and padding. Each MAC subheader corresponds to either a MAC SDU, a MAC CE, or padding. A MAC subheader except for fixed sized MAC CE, padding, and a MAC SDU containing UL CCCH consists of the four header fields: Reserved bit (R) field, Format (F) field, Logical Channel ID (LCD) field and Length (L) field. A MAC subheader for fixed sized MAC CE, padding, and a MAC SDU containing UL CCCH consists of the two header fields: Reserved bit (R) field and logical channel ID (LCD) field. MAC CEs are placed together. DL MAC subPDU(s) with MAC CE(s) is placed before any MAC subPDU with MAC SDU and MAC subPDU with padding (not shown). UL MAC subPDU(s) with MAC CE(s) is placed after all the MAC subPDU(s) with MAC SDU and before the MAC subPDU with padding in the MAC PDU as shown in FIG. 8. The size of padding can be zero.

As mentioned before, the UE MAC entity performs a logical channel prioritization procedure in order to generate a MAC PDU when there is an UL resource for a new transmission. For this, the MAC entity is configured with variable logical channel prioritization (LCP) parameters such as logical channel priority, PBR, bucket size duration, etc. Even though LCP procedure aims at fair resource allocation when there are multiple logical channels that may have pending data, it brings some complexity and latency from UE processing perspective. In addition, as the network does not know how the MAC PDU is generated by the MAC entity, the MAC entity always attach a MAC subheader in order to inform the necessary information for MAC PDU decoding of the network. Given that MAC subheader is from 1 byte to 3 bytes for every MAC subPDU and multiple MAC subPDUs may be included in one MAC PDU, total overhead due to the MAC subheaders would not be negligible.

Typically, the LCP procedure takes much time. For example, in the conventional LTE system, up to 4 ms was considered for the LCP procedure. In the wireless communication system compatible with NR, to meet the service requirement in terms of Quality of Service (QoS), various restrictions have been introduced which prevent or allow transmission of data from a logical channel depending on the characteristics of traffic and the UL resource. Therefore, more complexity is added on top of the existing LCP procedure.

Meanwhile, it is commonly understood that the network is responsible for controlling the use of uplink/downlink resources. For uplink, the network can control the use of the uplink resources by properly configuring LCP related parameters and LCP restrictions. Therefore, there is high possibility that the network has all the necessary information for decoding a MAC PDU.

Accordingly, more efficient mechanism can be considered in order to reduce the complexity or latency in the UE side while allowing proper use of uplink resource by considering the characteristics of traffic and the UL resource.

In the present disclosure, a UE (e.g. a MAC entity of the UE) receives information regarding a headerless MAC PDU format. Hereinafter, the information regarding a headerless MAC PDU format is referred to as "zeroHeaderInfo." A network (e.g. BS) provides with the UE with zeroHeaderInfo.

Figure 9:
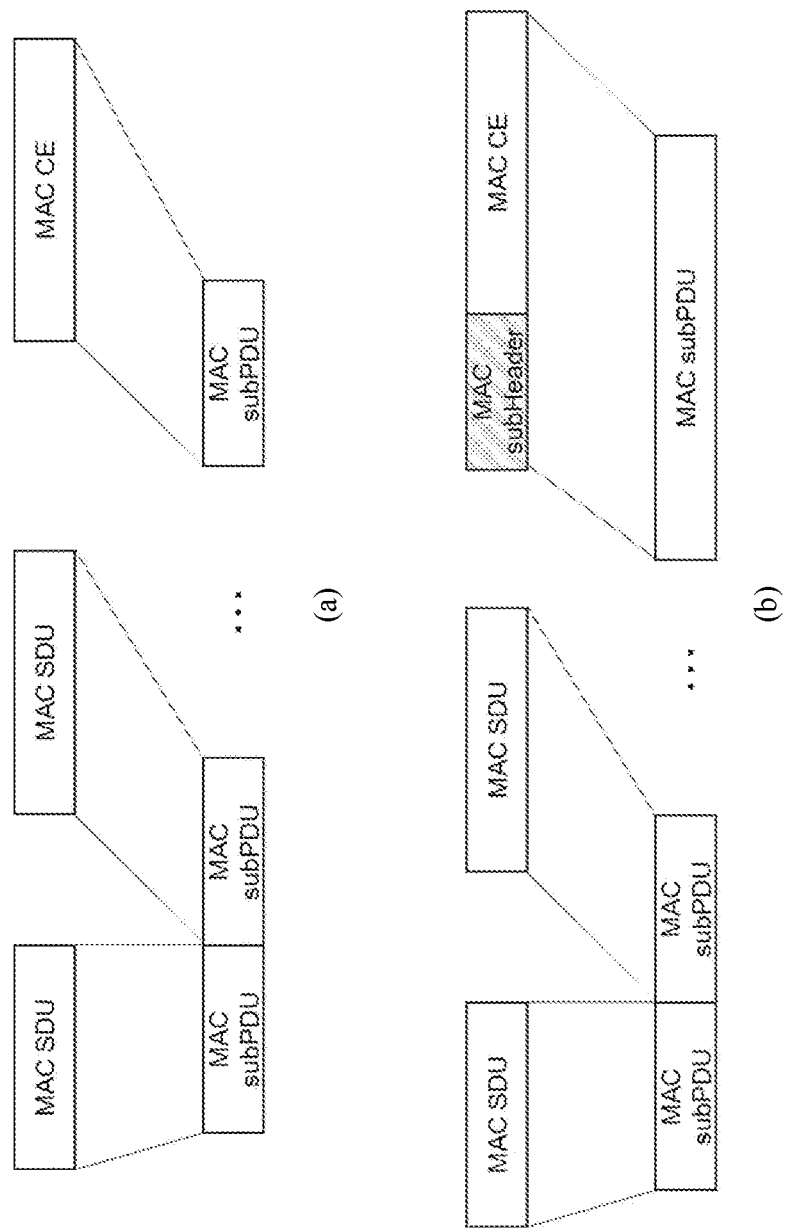
FIG. 9 illustrates examples of headerless MAC PDU.

FIG. 9 illustrates examples of headerless MAC PDU.

In the present disclosure, a headerless MAC PDU refers to a MAC PDU that is comprised of at least one MAC subPDU containing no MAC subheader. A MAC entity at a UE or network may generate a headerless MAC PDU such that all MAC subPDUs included in the headerless MAC PDU have no MAC subheader, as shown in FIG. 9(a). Hereinafter, a headerless MAC PDU in which all MAC subPDUs have no MAC subheader is referred to as a complete headerless MAC PDU. The MAC entity at the UE or network may generate a headerless MAC PDU such that some of MAC subPDUs included in the headerless MAC PDU have no MAC subheader, as shown in FIG. 9(b). Hereinafter, a headerless MAC PDU in which some of MAC subPDUs included in the headerless MAC PDU have no MAC subheader and at least one MAC subPDU included in the headerless MAC PDU has a MAC subheader is referred as a partial headerless MAC PDU. As shown in FIG. 9, a MAC subPDU without MAC subheader consists of MAC SDU only or MAC CE only.

For generation of a headerless MAC PDU, the zeroHeaderInfo provides all necessary information that allows the transmitter side (e.g. a UE or network) to generate a MAC subPDU not including a MAC subheader in the corresponding MAC subPDU but only including a MAC SDU or a MAC CE. From a perspective of a receiver side, when a receiver receives the headerless MAC PDU, the receiver can decode the MAC PDU based on the zeroHeaderInfo even if the MAC subPDU includes no MAC subheader.

Given that zeroHeaderInfo provides the detailed resource allocation for each logical channel or an individual MAC CE, a UE (or a MAC entity for the UE) would not need to perform a whole LCP procedure. According to some implementations of the present disclosure, as the UE can perform no LCP procedure or perform minimum LCP procedure, the latency can be reduced.

In particular, the zeroHeaderInfo may indicate a certain logical channel and/or a certain MAC CE that the transmitter (e.g. the MAC entity for the transmitter) shall include in the headerless MAC PDU, the size of the certain logical channel data and/or the certain MAC CE that the transmitter (e.g. the MAC entity for the transmitter) shall include in the headerless MAC PDU, and the order of the placement of the certain logical channel data and/or the certain MAC CE in the headerless MAC PDU. Based on this information, the transmitter (e.g. the MAC entity for the transmitter) may generate a headerless MAC PDU without attaching a MAC subheader to the concerned MAC subPDU.

Uplink Communication

In some implementations of the present disclosure, the behavior of a UE (or MAC entity at the UE) related to uplink transmission may be as follows. Hereinafter, for convenience of description, each of a UE and a MAC entity at the UE is referred to as "MAC entity".

Figure 10:
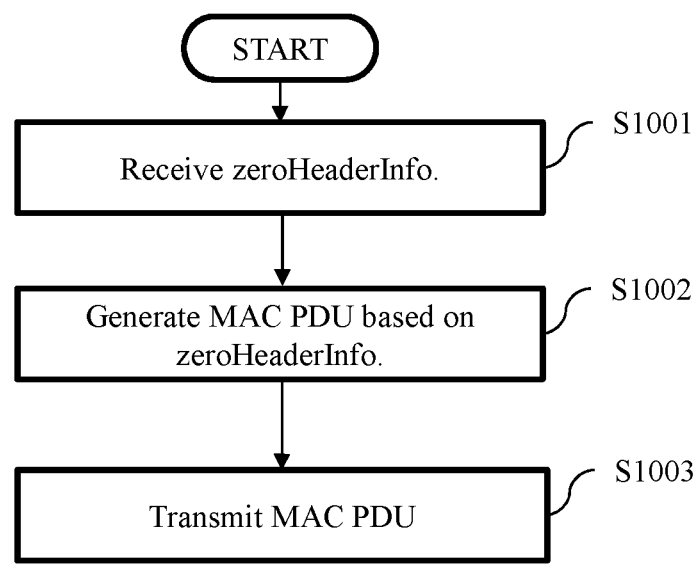
FIG. 10 illustrates an example of MAC PDU transmission according to some implementations of the present disclosure.

FIG. 10 illustrates an example of MAC PDU transmission according to some implementations of the present disclosure.

A MAC entity may receive information regarding a headerless MAC PDU format, i.e., zeroHeaderInfo (S1001). The zeroHeaderInfo may include i) information regarding at least one component and a size of each component that shall be included in the headerless MAC PDU and ii) information regarding an order of placement for components that shall be included in the headerless MAC PDU. In the present disclosure, the component refers to a logical channel data (MAC SDU) or a MAC CE.

For example, the information regarding at least one component and a size of each component that shall be included in the headerless MAC PDU may comprise a logical channel identifier (LCD), and an amount of data from the corresponding logical channel that shall be included in the headerless MAC PDU. The amount of data from the corresponding logical channel can be the size of one MAC subPDU or one MAC SDU from that logical channel. The zeroHeaderInfo can further include the number of MAC subPDUs or MAC SDUs from the corresponding logical channel that shall be included in the headerless MAC PDU. Alternatively, the UE may generate a MAC SDU to fit into the amount of data. For example, the UE (e.g. upper layer for the UE which is above the MAC layer in the protocol stacks of the UE) may perform Concatenation and Segmentation regarding multiple upper layer SDUs/PDUs (e.g., RLC SDUs/PDUs) to fit into the amount of data, whereby there is one MAC SDU provided to the MAC entity.

Alternatively or additionally, for example, the information regarding at least one component and a size of each component that shall be included in the headerless MAC PDU may comprise a logical channel group identifier (LCG ID), and an amount of data from each logical channel belonging to the corresponding LCG that shall be included in the headerless MAC PDU. The amount of data from the corresponding logical channel can be the size of one MAC subPDU or one MAC SDU from that logical channel. The zeroHeaderInfo can further include the number of MAC subPDUs or MAC SDUs from the corresponding logical channel that shall be included in the headerless MAC PDU. Alternatively, the UE may generate a MAC SDU to fit into the amount of data. For example, the UE (e.g. upper layer for the UE which is above the MAC layer in the protocol stacks of the UE)) may perform Concatenation and Segmentation regarding multiple upper layer SDUs/PDUs (e.g., RLC SDUs/PDUs) to fit into the amount of data, whereby there is one MAC SDU provided to the MAC entity.

Alternatively or additionally, for example, the information regarding at least one component and a size of each component that shall be included in the headerless MAC PDU may comprise a MAC Control Element and the size of the corresponding MAC CE that shall be included in the headerless MAC PDU.

As for the information regarding an order of placement for components that shall be included in the headerless MAC PDU, the order of placement can be a sequential order of placement for each component from the leftmost/rightmost bit to the rightmost/leftmost bit within the headerless MAC PDU, or the order of placement can be an absolute position of placement for each component within the headerless MAC PDU. For a complete headerless MAC PDU, the order of placement may be given for all components that shall be included in the headerless MAC PDU. For a partial headerless MAC PDU, the order of placement may be given for a certain components that shall be included in the headerless MAC PDU.

The MAC entity may receive zeroHeaderInfo above per logical channel, per MAC Control Element (CE), per UL grant, per Configured Grant (CG), per Bandwidth Part (BWP)/Carrier/Cell, per MAC entity, and/or per UE.

In some scenarios, zeroHeaderInfo per logical channel may mean that the zeroHeaderInfo is associated with and applied only to a concerned logical channel. For example, when the MAC entity generates a headerless MAC PDU including data for the concerned logical channel, the MAC entity does not attach a MAC subheader regarding a MAC SDU from the concerned logical channel based on the zeroHeaderInfo while the MAC entity attaches a MAC subheader regarding a MAC SDU from other logical channels except for the concerned logical channel. The zeroHeaderInfo can be different for different logical channels. A MAC subPDU without any MAC subheader can be included in the same MAC PDU together with a MAC subPDU with a MAC subheader.

In some scenarios, zeroHeaderInfo per MAC Control Element (CE) may mean that the zeroHeaderInfo is associated with and applied only to a concerned MAC CE. For example, when the MAC entity generates a MAC PDU including the concerned MAC CE, the MAC entity does not attach a MAC subheader regarding the concerned MAC CE based on the zeroHeaderInfo while the MAC entity attaches a MAC subheader regarding other MAC CEs except for the concerned MAC CE. The zeroHeaderInfo can be different for different MAC CEs. A MAC subPDU without any MAC subheader can be included in the same MAC PDU together with and a MAC subPDU with a MAC subheader.

In some scenarios, zeroHeaderInfo per UL grant may mean that the zeroHeaderInfo is associated with a concerned UL grant and applied only to a concerned UL grant. For example, when the MAC entity generates a MAC PDU to be transmitted by using the concerned UL grant, the MAC entity does not attach a MAC subheader regarding all MAC SDU(s) or MAC CE(s) included in the MAC PDU. The zeroHeaderInfo can be different for different UL grants. All MAC subPDU(s) in the same MAC PDU transmitted on the concerned UL grant may have no MAC subheader.

In some scenarios, zeroHeaderInfo per Configured Grant (CG) may mean that the zeroHeaderInfo is associated with and applied to all UL grants scheduling a new transmission for the CG. For example, when the MAC entity generates a MAC PDU to be transmitted by using the concerned CG resource, the MAC entity does not attach a MAC subheader regarding all MAC SDU(s) or MAC CE(s) included in the MAC PDU. If there are multiple CGs configured to the MAC entity, the zeroHeaderInfo can be different for different CGs. All MAC subPDU(s) in the same MAC PDU transmitted on the CG may have no MAC subheader.

In some scenarios, zeroHeaderInfo per Bandwidth Part (BWP)/Carrier/Cell may mean that the zeroHeaderInfo is associated with and applied to all UL grants scheduling a new transmission for a BWP, Carrier, and/or Cell. For example, when the MAC entity generates a MAC PDU to be transmitted by using any UL resource (e.g., dynamic UL grant or CG) on the concerned BWP/Carrier/Cell, the MAC entity does not attach a MAC subheader regarding all MAC SDU(s) or MAC CE(s) included in the MAC PDU. If there are multiple BWPs/Carriers/Cells configured to the MAC entity, the zeroHeaderInfo can be different for different BWPs/Carriers/Cells. All MAC subPDU(s) in the same MAC PDU transmitted on the BWP/Carrier/Cell may have no MAC subheader.

In some scenarios, zeroHeaderInfo per MAC entity or UE may mean that the zeroHeaderInfo is associated with and applied to all UL grants scheduling a new transmission to the MAC/UE. For example, when the concerned MAC entity or the concerned UE generates a MAC PDU to be transmitted, the concerned MAC entity or the concerned UE does not attach a MAC subheader regarding all MAC SDU(s) or MAC CE(s) included in the MAC PDU. If there are multiple MAC entities configured to the UE, the zeroHeaderInfo can be different for different MAC entities. All MAC subPDU(s) in the same MAC PDU transmitted by the MAC/UE may have no MAC subheader.

The MAC entity may receive zeroHeaderInfo via L1 signalling (e.g., DCI), via L2 signalling (e.g., MAC CE, RLC control PDU, PDCP control PDU), or via L3 signalling (e.g. RRC message). For example, the MAC entity may receive zeroHeaderInfo via:
- an UL grant scheduling a new transmission (e.g., DCI); or
- a BWP switching command (e.g., DCI); or
- a CG activation command; or
- MAC signaling that is related to CG/BWP/Carrier/Cell/MAC/UE (e.g., SCell Activation/Deactivation MAC CE); or
- RRC signaling that is related to CG/BWP/Carrier/Cell/MAC/UE (e.g., CG configuration, BWP configuration, Cell configuration, MAC configuration, etc).

The MAC entity may further receive information on a validity duration of zeroHeaderInfo in units of symbol/slot/subframe or absolute time duration. If the MAC entity receives the validity duration, the MAC entity may consider that the zeroHeaderInfo is valid for each UL grant/CG/BWP/Carrier/Cell/MAC/UE for the validity duration in the time domain.

The MAC entity may receive an UL grant dynamically on a physical downlink control channel (PDCCH) or in a random access response (RAR), or may be configured with Configured Grant (CG) from the network. If the MAC entity has an UL grant, or if the MAC entity has an (dynamic or configured) UL grant associated with a zeroHeaderInfo, the MAC entity may generate a MAC PDU to be transmitted on an UL resource according to the UL grant (S1002). For example, the MAC entity may generate a MAC PDU as follows.

1) For the concerned logical channel, the MAC entity may generate a MAC PDU as follows:
- the MAC entity selects a concerned logical channel which is indicated by the zeroHeaderInfo associated with the UL grant, if there is any concerned logical channel according to the zeroHeaderInfo. If zeroHeaderInfo is per logical channel, only the logical channel indicated in ZeroHeaderInfo is the concerned logical channel. If zeroHeaderInfo is per MAC CE, UL grant, CG, BWP, Carrier, Cell, MAC entity, or UE, all logical channels are concerned logical channels.
- the MAC entity assigns a part of the UL resource to a concerned logical channel according to the zeroHeaderInfo. The UE may generate MAC SDU(s) according to the assigned UL resource. For example, the MAC entity may request that upper layers (e.g., RLC) deliver MAC SDU(s) to the MAC entity according to the assigned UL resource. When the MAC entity assigns the part of the UL resource to the concerned logical channel, the MAC entity does not count the MAC subheader size for the concerned logical channel.
- the MAC entity receives a MAC SDU from the upper layers for the concerned logical channel.
- the MAC entity generates a MAC subPDU by including the MAC SDU but not including any MAC subheader corresponding to this MAC SDU. Even if the upper layers does not deliver any MAC SDU to the MAC entity, i.e., when there is no pending data, the MAC entity may generate the MAC SubPDU by filling the assigned part with padding bits.

2) For the concerned MAC CE, the MAC entity may generate a MAC PDU as follows:

the MAC entity selects a concerned MAC CE, if there is any concerned MAC CE according to the zeroHeaderInfo.

the MAC entity assigns a part of the UL resource to a concerned MAC CE according to the zeroHeaderInfo.

when the MAC entity assigns the part of the UL resource to the concerned MAC CE, the MAC entity does not count the MAC subheader size for the concerned MAC CE. In some implementations of the present disclosure, the MAC entity may truncate the concerned MAC CE. For example, if the size of the concerned MAC CE indicated by the zeroHeaderInfo is smaller than the full size of the concerned MAC CE, the MAC may truncate the concerned MAC CE so that the truncated MAC CE is fit into the size according to the zeroHeaderInfo. For example, a Long BSR MAC CE can be truncated to be a Long Truncated BSR MAC CE or Short Truncated BSR MAC CE, depending on the size indicated by the zeroHeaderInfo.

the MAC entity generates a MAC subPDU by including the MAC CE but not including any MAC subheader corresponding to this MAC CE.

3) For other components except for the concerned logical channel and/or the concerned MAC CE, the MAC entity may generate a MAC PDU as follows:

if UL resources are remained for the UL grant after assigning a part of UL resources to concerned logical channels and concerned MAC CEs, the MAC entity may perform a logical channel prioritization (LCP) procedure for the remaining UL resources. When the MAC entity assigns remaining part of the UL resource to the logical channel or the MAC CE except for the concerned logical channel or the concerned MAC CE, the MAC entity counts the MAC subheader size for the logical channel or the MAC CE.

the MAC entity generates a MAC subPDU by including a MAC SDU or a MAC CE, and additionally including corresponding MAC subheader for each of the MAC SDU or the MAC CE.

The MAC entity may generate a headerless MAC PDU by placing the generated MAC subPDUs of the concerned logical channel and/or the concerned MAC CE according to the order of placement indicated by the zeroHeaderInfo.

In some scenarios, zeroHeaderInfo may not include information regarding the order of placement for logical channel(s) or MAC CE(s) other than the concerned ones. In these scenarios, if there are MAC subPDU(s) having MAC subheader(s) as a result of LCP procedure, the MAC entity may place these MAC subPDU(s) after all MAC subPDU(s) having no MAC subheader within the headerless MAC PDU or prior to the MAC subPDU(s) having no MAC subheader within the headerless MAC PDU.

According to the some implementations of the present disclosure, the MAC entity may prioritize including data from the concerned logical channel into a MAC PDU even if there are pending data from logical channels other than the concerned logical channel, and even if these logical channels are of higher priority than that of the concerned logical channel.

The MAC entity sends the generated headerless MAC PDU to the network by using the UL grant (S1003).

Figure 11:
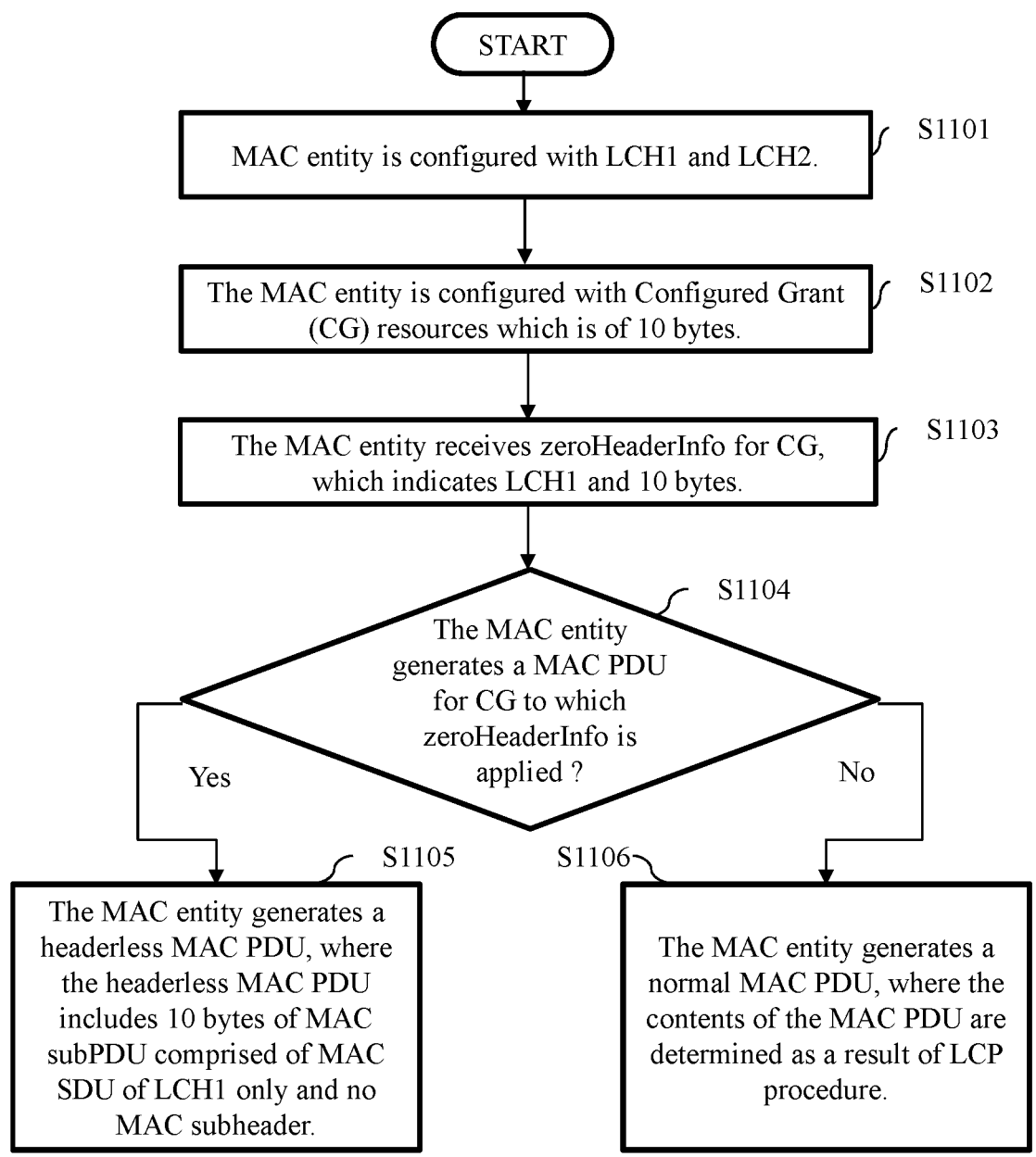
FIG. 11 illustrates an example of a complete headerless MAC PDU generation according to some implementations of the present disclosure.

FIG. 11 illustrates an example of a complete headerless MAC PDU generation according to some implementations of the present disclosure.

In the example of FIG. 11, the MAC entity for a UE is configured with a logical channel, LCH1 and LCH2 (S1101). Configuration information on LCH1 and LCH2 may be provided by the network to the UE. The MAC entity is configured with Configured Grant resources, which can include 10 bytes of a MAC PDU (S1102). Configuration information on the Configured Grant resources may be provided by the network to the UE. The MAC entity further receives zeroHeaderInfo for that CG, which indicates LCH1 and 10 bytes data from LCH1 (S1103). In FIG. 11, the order of S1101 and S1102/S1103 may be changed from each other.

When the MAC entity generates a MAC PDU, the MAC entity may determine whether the MAC PDU generation is for CG to which zeroHeaderInfo is applied (S1104). The MAC entity generates a headerless MAC PDU to be transmitted on the CG resource by including only 10 bytes of data from LCH1 and by not including any MAC subheader for this MAC subPDU (S1105) if MAC PDU generation is for CG to which zeroHeaderInfo is applied (S1104, Yes). The MAC entity generates a normal MAC PDU by including data from LCH1 and LCH2 and corresponding MAC subheaders according to the LCP procedure (S1106) if MAC PDU generation is not for CG to which zeroHeaderInfo is applied (S1104, No).

Figure 12:
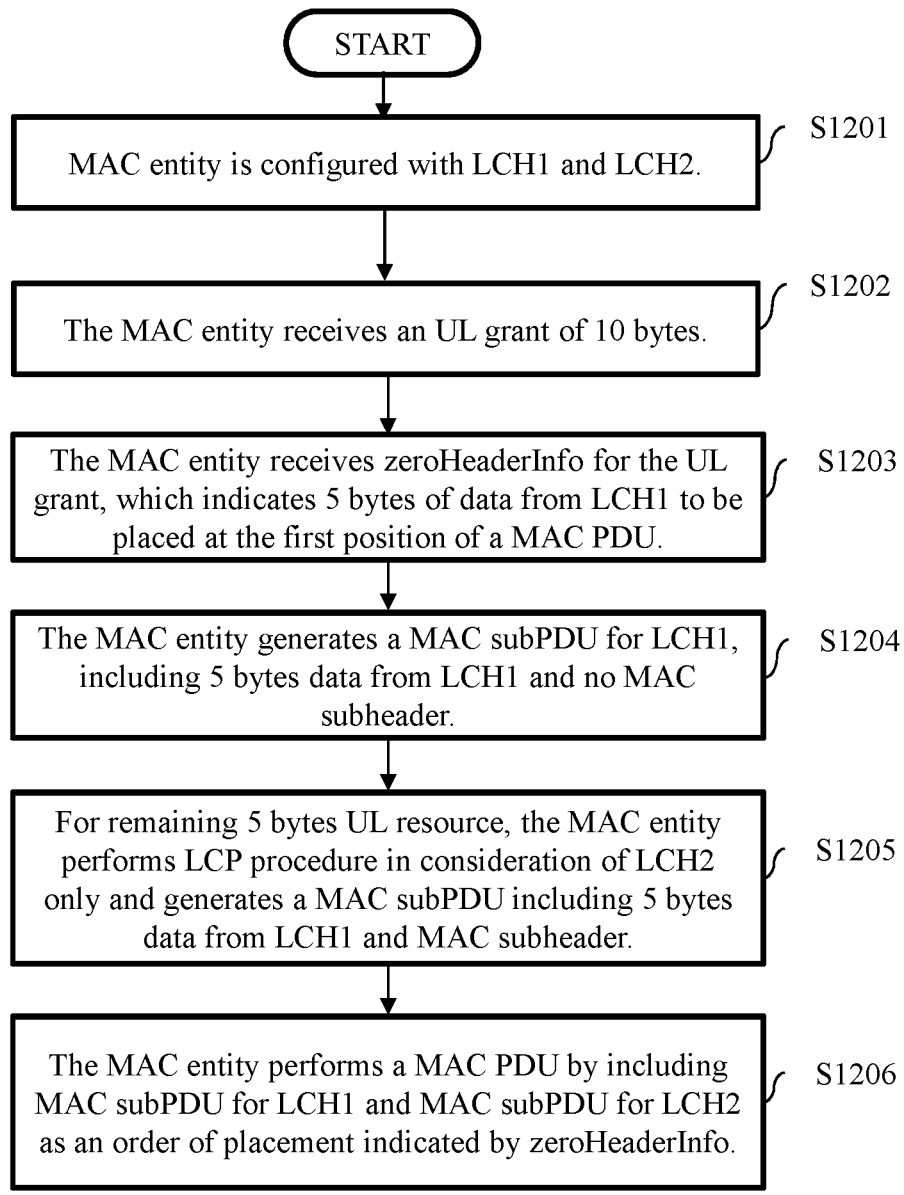
FIG. 12 illustrates an example of a partial headerless MAC PDU generation according to some implementations of the present disclosure.

FIG. 12 illustrates an example of a partial headerless MAC PDU generation according to some implementations of the present disclosure.

In the example of FIG. 12, the MAC entity is configured with logical channels including LCH1 and LCH2 (S1201). Configuration information on LCH1 and LCH2 may be provided by the network to the UE. In the example of FIG. 12, the MAC entity receives an UL grant which can accommodate 10 bytes of a MAC PDU (S1202). In the example of FIG. 12, the MAC entity further receives zeroHeaderInfo for that UL grant, where the zeroHeaderInfo includes information regarding LCH1 and 5 bytes data from LCH1 (S1203). When the MAC entity generates a MAC PDU, the MAC entity generates a MAC subPDU for LCH1 by including 5 bytes from LCH1 and no MAC subheader (S1204). As there are 5 bytes of remaining UL resources for that UL grant in the example of FIG. 12, the MAC entity further performs an LCP procedure regarding LCH2 only, and generates a MAC subPDU including 5 bytes data from LCH2 and a corresponding MAC subheader (S1205). Then, the MAC entity generates a partial headerless MAC PDU by including the MAC subPDU for LCH1 (without MAC subheader) and the MAC subPDU for LCH2 according to the order of placement indicated by zeroHeaderInfo (S1206).

In some implementations of the present disclosure, the behavior of a network (or MAC entity at the network) related to uplink reception may be as follows.

Figure 13:
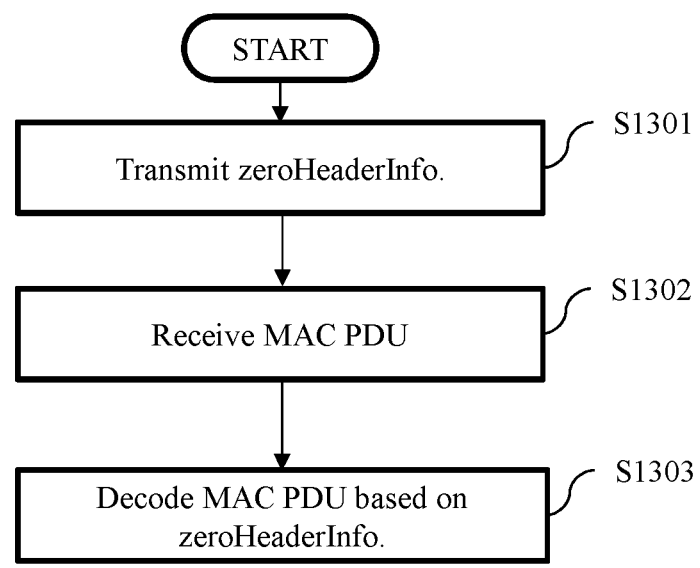
FIG. 13 illustrates an example of receiving a data unit at the network according to some implementations of the present disclosure.

FIG. 13 illustrates an example of receiving a data unit at the network according to some implementations of the present disclosure.

The network may transmit zeroHeaderInfo to a MAC entity of a UE (S1301). The zeroHeaderInfo may include i) information regarding at least one component and a size of each component that shall be included in the headerless MAC PDU and ii) information regarding an order of placement for components that shall be included in the headerless MAC PDU. In the present disclosure, the component refers to a logical channel data (MAC SDU) or a MAC CE.

For example, the information regarding at least one component and a size of each component that shall be included in the headerless MAC PDU may comprise a logical channel identifier (LCD), and an amount of data from the corresponding logical channel that shall be included in the headerless MAC PDU. The amount of data from the corresponding logical channel can be the size of one MAC subPDU or one MAC SDU from that logical channel. The zeroHeaderInfo can further include the number of MAC subPDUs or MAC SDUs from the corresponding logical channel that shall be included in the headerless MAC PDU. Alternatively, an upper layer in the UE above the MAC entity of the UE may perform Concatenation and Segmentation regarding multiple upper layer SDUs/PDUs (e.g., RLC SDUs/PDUs) to fit into the amount of data. In this case, in the network, there is one MAC SDU provided from a MAC entity for the UE at a reception opportunity. The network (e.g. upper layer above MAC in the network) may obtain the multiple upper layer SDUs from the MAC SDU.

Alternatively or additionally, for example, the information regarding at least one component and a size of each component that shall be included in the headerless MAC PDU may comprise a logical channel group identifier (LCG ID), and an amount of data from each logical channel belonging to the corresponding LCG that shall be included in the headerless MAC PDU. The amount of data from the corresponding logical channel can be the size of one MAC subPDU or one MAC SDU from that logical channel. The zeroHeaderInfo can further include the number of MAC subPDUs or MAC SDUs from the corresponding logical channel that shall be included in the headerless MAC PDU. Alternatively, an upper layer in the UE above the MAC entity of the UE may perform Concatenation and Segmentation regarding multiple upper layer SDUs/PDUs (e.g., RLC SDUs/PDUs) to fit into the amount of data. In this case, in the network, there is one MAC SDU provided from a MAC entity for the UE at a reception opportunity. The network (e.g. upper layer above MAC in the network) may obtain the multiple upper layer SDUs from the MAC SDU.

Alternatively or additionally, for example, the information regarding at least one component and a size of each component that shall be included in the headerless MAC PDU may comprise a MAC Control Element and the size of the corresponding MAC CE that shall be included in the headerless MAC PDU.

As for the information regarding an order of placement for components that shall be included in the headerless MAC PDU, the order of placement can be a sequential order of placement for each component from the leftmost/rightmost bit to the rightmost/leftmost bit within the headerless MAC PDU, or the order of placement can be an absolute position of placement for each component within the headerless MAC PDU. For a complete headerless MAC PDU, the order of placement may be given for all components that shall be included in the headerless MAC PDU. For a partial headerless MAC PDU, the order of placement may be given for a certain components that shall be included in the headerless MAC PDU.

The network may transmit zeroHeaderInfo to the MAC entity for the UE (i.e. UE MAC entity) via L1, L2, or L3 signalling. For example, the network may transmit zeroHeaderInfo via:

an UL grant scheduling a new transmission (e.g., DCI); or
a BWP switching command (e.g., DCI); or
a CG activation command; or
MAC signaling that is related to CG/BWP/Carrier/Cell/MAC/UE (e.g., SCell Activation/Deactivation MAC CE); or
RRC signaling that is related to CG/BWP/Carrier/Cell/MAC/UE (e.g., CG configuration, BWP configuration, Cell configuration, MAC configuration, etc).

The network may transmit zeroHeaderInfo per logical channel, per MAC Control Element (CE), per UL grant, per Configured Grant (CG), per Bandwidth Part (BWP)/Carrier/Cell, per MAC entity, and/or per UE.

In some scenarios, zeroHeaderInfo per logical channel may mean that the zeroHeaderInfo is associated with and applied only to a concerned logical channel. For example, when the UE MAC entity generates a headerless MAC PDU including data for the concerned logical channel, the UE MAC entity does not attach a MAC subheader regarding a MAC SDU from the concerned logical channel based on the zeroHeaderInfo while the UE MAC entity attaches a MAC subheader regarding a MAC SDU from other logical channels except for the concerned logical channel. The zeroHeaderInfo can be different for different logical channels. A MAC subPDU without any MAC subheader can be included in the same MAC PDU together with a MAC subPDU with a MAC subheader.

In some scenarios, zeroHeaderInfo per MAC Control Element (CE) may mean that the zeroHeaderInfo is associated with and applied only to a concerned MAC CE. For example, when the UE MAC entity generates a MAC PDU including the concerned MAC CE, the UE MAC entity does not attach a MAC subheader regarding the concerned MAC CE based on the zeroHeaderInfo while the UE MAC entity attaches a MAC subheader regarding other MAC CEs except for the concerned MAC CE. The zeroHeaderInfo can be different for different MAC CEs. A MAC subPDU without any MAC subheader can be included in the same MAC PDU together with and a MAC subPDU with a MAC subheader.

In some scenarios, zeroHeaderInfo per UL grant may mean that the zeroHeaderInfo is associated with a concerned UL grant and applied only to a concerned UL grant. For example, when the UE MAC entity generates a MAC PDU to be transmitted by using the concerned UL grant, the UE MAC entity does not attach a MAC subheader regarding all MAC SDU(s) or MAC CE(s) included in the MAC PDU. The zeroHeaderInfo can be different for different UL grants. All MAC subPDU(s) in the same MAC PDU transmitted on the concerned UL grant may have no MAC subheader.

In some scenarios, zeroHeaderInfo per Configured Grant (CG) may mean that the zeroHeaderInfo is associated with and applied to all UL grants scheduling a new transmission for the CG. For example, when the UE MAC entity generates a MAC PDU to be transmitted by using the concerned CG resource, the UE MAC entity does not attach a MAC subheader regarding all MAC SDU(s) or MAC CE(s) included in the MAC PDU. If there are multiple CGs configured to the UE MAC entity, the zeroHeaderInfo can be different for different CGs. All MAC subPDU(s) in the same MAC PDU transmitted on the CG may have no MAC subheader.

In some scenarios, zeroHeaderInfo per Bandwidth Part (BWP)/Carrier/Cell may mean that the zeroHeaderInfo is associated with and applied to all UL grants scheduling a new transmission for a BWP, Carrier, and/or Cell. For example, when the UE MAC entity generates a MAC PDU to be transmitted by using any UL resource (e.g., dynamic UL grant or CG) on the concerned BWP/Carrier/Cell, the UE MAC entity does not attach a MAC subheader regarding all MAC SDU(s) or MAC CE(s) included in the MAC PDU. If there are multiple BWPs/Carriers/Cells configured to the UE MAC entity, the zeroHeaderInfo can be different for different BWPs/Carriers/Cells. All MAC subPDU(s) in the same MAC PDU transmitted on the BWP/Carrier/Cell may have no MAC subheader.

In some scenarios, zeroHeaderInfo per MAC entity or UE may mean that the zeroHeaderInfo is associated with and applied to all UL grants scheduling a new transmission to the MAC/UE. For example, when the concerned MAC entity or the concerned UE generates a MAC PDU to be transmitted, the concerned MAC entity or the concerned UE does not attach a MAC subheader regarding all MAC SDU(s) or MAC CE(s) included in the MAC PDU. If there are multiple MAC entities configured to the UE, the zeroHeaderInfo can be different for different MAC entities. All MAC subPDU(s) in the same MAC PDU transmitted by the MAC/UE may have no MAC subheader.

The network may transmit an UL grant dynamically on a physical downlink control channel (PDCCH) or in a random access response to the UE, or configure UL grant semi-persistently to the UE by RRC signalling. For example, the network sends an UL grant for a new transmission in uplink to the MAC entity. The network may send the UL grant in response to a scheduling request (SR) or random access preamble transmitted by the UE MAC entity.

In the example of FIG. 13, the network receives a headerless MAC PDU transmitted on the UL resource according to the (dynamic or configured) UL grant (S1302). The headerless MAC PDU comprises a MAC subPDU including a certain amount of data from the concerned logical channel(s) or the concerned MAC CE(s) and not including any MAC subheader for that MAC subPDU. When the network receives the headerless MAC PDU including no MAC subheader for a certain MAC subPDU (S1302), the network decodes the headerless MAC PDU (S1303) based on the transmitted zeroHeaderInfo associated with the UL grant.

Figure 14:
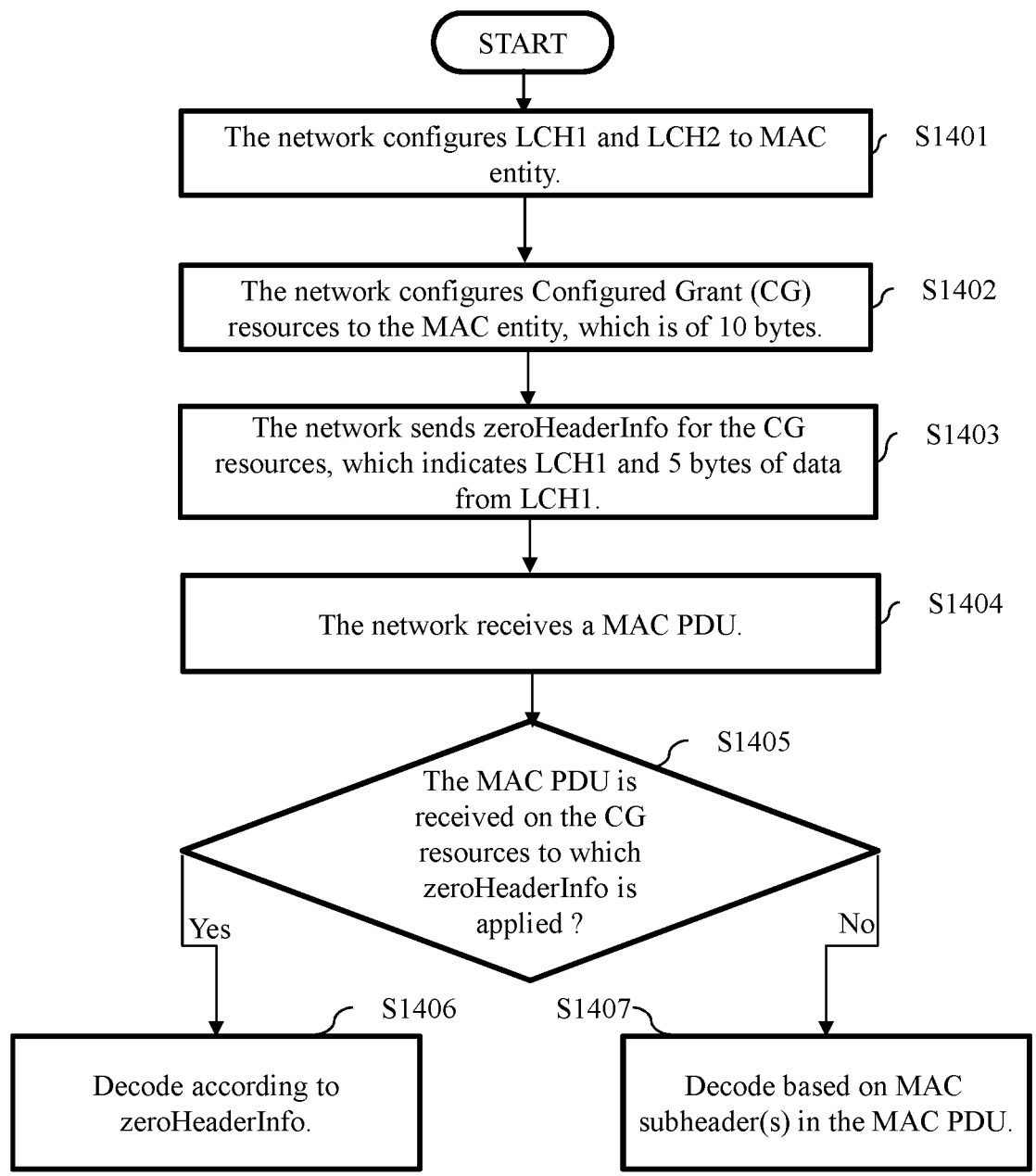
FIG. 14 illustrates an example of decoding a MAC PDU according to some implementations of the present disclosure.

FIG. 14 illustrates an example of decoding a MAC PDU according to some implementations of the present disclosure.

In the example of FIG. 14, the network configures LCH1 and LCH2 (S1401) to a MAC entity for a UE. The network configures Configured Grant (CG) resources to the MAC entity, where the resources based on the CG can accommodate 10 bytes of data (S1402). The network further transmits zeroHeaderInfo for the CG resources, where zeroHeaderInfo includes information regarding LCH1 and 5 bytes of data from LCH1 (S1403). The network receives a MAC PDU from the MAC entity (S1404). The network determines whether the MAC PDU is received on the CG resources to which the zeroHeaderInfo is applied (S1405). The network decodes the MAC PDU according to the zeroHeaderInfo, even if there is no MAC subheader included in the MAC subPDU (S1406), when the MAC PDU is received on the CG resources to which zeroHeaderInfo is applied (S1405, Yes). The network decodes the MAC PDU according to the MAC subheader included in the MAC subPDU (S1407) when the MAC PDU is not received on the CG resources to which zeroHeaderInfo is applied (S1405, No).

Figure 15:
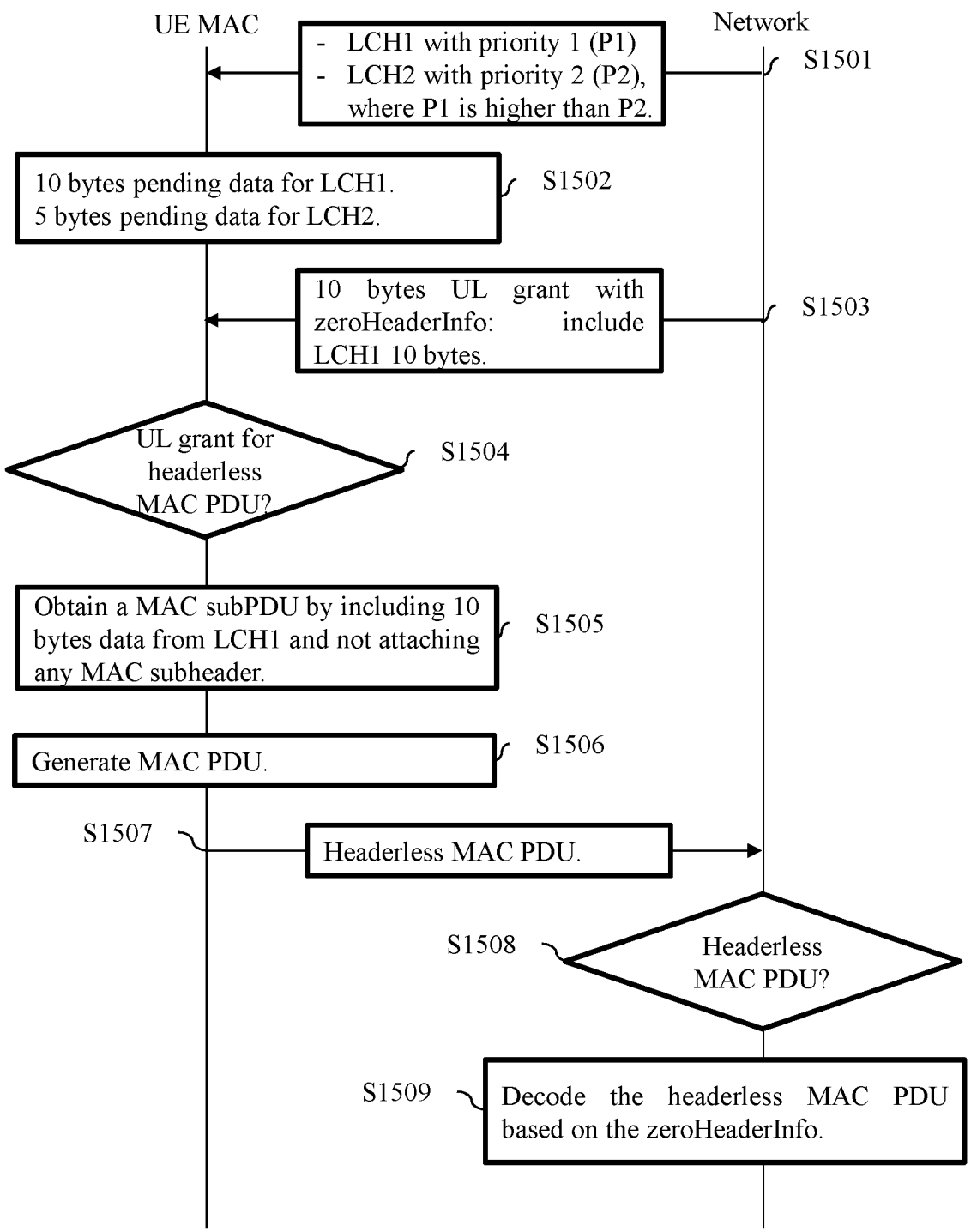
FIG. 15 illustrates an example of UL communication between a UE and a network according to some implementations of the present disclosure.

FIG. 15 illustrates an example of UL communication between a UE and a network according to some implementations of the present disclosure.

In the example of FIG. 15, the MAC entity for the UE (i.e. UE MAC entity) is configured with two logical channels, LCH1 and LCH2, where the logical channel priority (P2) of LCH2 is higher than that (P1) of LCH2 (S1501). The UE MAC entity has 10 bytes and 5 bytes of pending data for LCH1 and LCH2, respectively (S1502). The UE MAC entity receives 10 bytes of UL grant with zeroHeaderInfo, where the zeroHeaderInfo includes information regarding LCH1 and 10 bytes of data from LCH1 only (S1503). The UE MAC entity determines whether the UL grant is for a headerless MAC PDU (S1504). In the example of FIG. 15, as the received UL grant is for a headerless MAC PDU, the UE MAC entity obtains a MAC subPDU by including 10 bytes data from LCH1 according to the zeroHeaderInfo, even if the LCH2 has higher priority than LCH1 and has pending data (S1505). The UE MAC entity generates a headerless MAC PDU (S1506) according to the result of the step S1505. The UE MAC entity transmits the generated headerless MAC PDU (S1507). When the network receives a MAC PDU, the network determines whether the received MAC PDU is a headerless MAC PDU (S1508). For example, the network determines that the MAC PDU is a headerless MAC PDU when the network has received the MAC PDU on the UL Grant associated with zeroHeaderInfo. The network decodes the headerless MAC PDU according to the zeroHeaderInfo sent by the network (1509).

Downlink Communication

Figure 16:
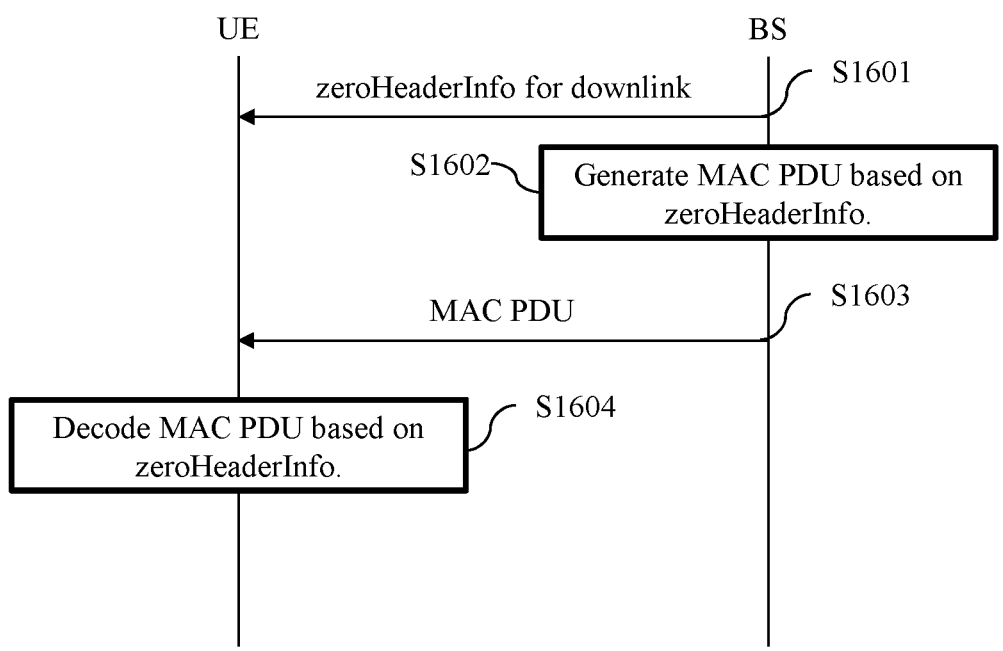
FIG. 16 illustrates an example of downlink communication according to some implementations of the present disclosure.

Some implementations of the present disclosure described above can be applied to downlink communication as well as uplink communication. FIG. 16 illustrates an example of downlink communication according to some implementations of the present disclosure.

Referring to FIG. 16, the network (e.g. BS) provides zeroHeaderInfo for downlink to the UE MAC entity, where zeroHeaderInfo includes information regarding the detailed format of a headerless MAC PDU (S1601). The network generates a MAC PDU based on the zeroHeaderInfo (S1602). For example, the network generates a headerless MAC PDU based on the zeroHeaderInfo (S1602) and transmits the generated MAC PDU to the UE MAC entity (S1603). In FIG. 16, the order of S1601 and S1602 may be changed from each other. For example, the network may generate a headerless MAC PDU and provide information on the headerless MAC PDU to a UE.

The UE (e.g. UE MAC entity) receive the zeroHeaderInfo for downlink (S1601). When the UE MAC entity receives a MAC PDU (S1603), the UE MAC entity determines whether the received MAC PDU is a headerless MAC PDU or not based on the received zeroHeaderInfo for downlink. If the UE MAC entity receives a headerless MAC PDU (S1603), the UE MAC entity decodes the received headerless MAC PDU according to the zeroHeaderInfo (S1604) even if the headerless MAC PDU includes no MAC subheader for a MAC subPDU.

A transceiver (hereinafter, UE transceiver) of a UE may receive radio signals including information on a headerless MAC PDU format, i.e., zeroHeaderInfo, and provide zeroHeaderInfo to a processor (hereinafter, UE processor), which is mounted on, installed on, or connected to the UE, under the control of the UE processor. The zeroHeaderInfo may include following information: at least one component and size of each component that shall be included in the headerless MAC PDU, where the component refers to a logical channel data (MAC SDU) or a MAC CE; and/or an order of placement for components that shall be included in the headerless MAC PDU.

The UE transceiver or the UE processor may receive the zeroHeaderInfo above per logical channel, per MAC Control Element (CE), per UL grant, per Configured Grant (CG), per Bandwidth Part (BWP)/Carrier/Cell, per MAC entity, and/or per UE. The UE transceiver or the UE processor may receive the zeroHeaderInfo via L1, L2, or L3 signalling. For example, the UE transceiver or processor may receive the zeroHeaderInfo via:

an UL grant scheduling a new transmission (e.g., DCI); or
a BWP switching command (e.g., DCI); or
a CG activation command; or a MAC signaling that is related to CG/BWP/Carrier/Cell/MAC/UE, e.g., SCell Activation/Deactivation MAC CE; or an RRC signaling that is related to CG/BWP/Carrier/Cell/MAC/UE, e.g., CG configuration, BWP configuration, Cell configuration, MAC configuration, etc.

The UE transceiver or the UE processor may further receive information on a validity duration of zeroHeaderInfo in units of symbol/slot/subframe or absolute time duration. If the UE processor receives the validity duration, the UE processor may apply the zeroHeaderInfo for each UL grant/CG/BWP/Carrier/Cell/MAC/UE for the validity duration in the time domain.

The UE transceiver or the UE processor may receive an UL grant dynamically on a physical downlink control channel (PDCCH) or in a random access response (RAR). Or the UE processor may be configured with Configured Grant (CG) from the network.

If the UE processor has an UL grant, or if the UE processor has an (dynamic or configured) UL grant associated with zeroHeaderInfo, the UE processor may generates a MAC PDU to be transmitted on an UL resource according to the UL grant. For example, the UE processor may generate a MAC PDU as follows:

1) For the concerned logical channel, the MAC entity may generate a MAC PDU as follows.

the UE processor selects a concerned logical channel which is indicated by the zeroHeaderInfo associated with the UL grant, if there is any concerned logical channel according to the zeroHeaderInfo. If zeroHeaderInfo is per logical channel, only the logical channel indicated in ZeroHeaderInfo is the concerned logical channel. If zeroHeaderInfo is per MAC CE, UL grant, CG, BWP, Carrier, Cell, MAC entity, or UE, all logical channels are concerned logical channels.

the UE processor assigns a part of the UL resource to a concerned logical channel according to the zeroHeaderInfo. The UE processor may generate MAC SDU(s) according to the assigned UL resource. For example, the UE processor may be configured such that the MAC entity in the UE processor requests that upper layers (e.g., RLC) in the UE processor deliver MAC SDU(s) to the MAC entity according to the assigned UL resource. When the UE processor assigns the part of the UL resource to the concerned logical channel, the UE processor does not count the MAC subheader size for the concerned logical channel.

the UE processor may be configured such that the upper layer(s) generate the MAC SDU for the concerned logical channel. The UE processor may be configured such that the MAC entity in the UE processor receives from the upper layers for the concerned logical channel.

the UE processor generates a MAC subPDU by including the MAC SDU but not including any MAC subheader corresponding to this MAC SDU. Even if the upper layers in the UE processor does not deliver any MAC SDU to the MAC entity, i.e., when there is no pending data, the UE processor may generate the MAC Sub-PDU by filling the assigned part with padding bits.

2) For the concerned MAC CE, the MAC entity may generate a MAC PDU as follows.

the UE processor selects a concerned MAC CE, if there is any concerned MAC CE according to the zeroHeaderInfo.

the UE processor assigns a part of the UL resource to a concerned MAC CE according to the zeroHeaderInfo.

when the UE processor assigns the part of the UL resource to the concerned MAC CE, the UE processor does not count the MAC subheader size for the concerned MAC CE. The UE processor may truncate the concerned MAC CE. If the size of the concerned MAC CE indicated by the zeroHeaderInfo is smaller than the full size of the concerned MAC CE, the UE processor may truncate the concerned MAC CE so that the truncated MAC CE is fit into the size according to the zeroHeaderInfo. For example, Long BSR MAC CE can be truncated to Long Truncated BSR MAC CE or Short Truncated BSR MAC CE depending on the size indicated by the zeroHeaderInfo.

the UE processor generate a MAC subPDU by including the MAC CE but not including any MAC subheader corresponding to this MAC CE.

3) For other components except for the concerned logical channel and/or the concerned MAC CE, the MAC entity may generate a MAC PDU as follows:

if UL resources are remained for the UL grant after assigning a part of UL resources to concerned logical channels and concerned MAC CEs, the UE processor may perform a logical channel prioritization (LCP) procedure for the remaining UL resources;

when the UE processor assigns remaining part of the UL resource to the logical channel or the MAC CE except for the concerned logical channel or the concerned MAC CE, the UE processor counts the MAC subheader size for the logical channel or the MAC CE (as in the conventional art).

the UE processor generates a MAC subPDU by including a MAC SDU or a MAC CE, and additionally including corresponding MAC subheader for each of the MAC SDU or the MAC CE.

The UE processor may generate a headerless MAC PDU by placing the generated MAC subPDUs of the concerned logical channel and/or the concerned MAC CE according to the order of placement indicated by the zeroHeaderInfo. In other words, the UE processor may be configured to prioritize data of the concerned logical channel, even if there are pending data from logical channels other than the concerned logical channel, and even if these logical channels are of higher priority than that of the concerned logical channel.

In some scenarios, zeroHeaderInfo may not indicate the order of placement for logical channel or MAC CE other than the concerned ones. In these scenarios, if there are MAC subPDUs having a MAC subheader as a result of LCP procedure, the UE processor may place these MAC subPDUs after all MAC subPDUs having no MAC subheader within the headerless MAC PDU or prior to all MAC subPDUs having no MAC subheader within the headerless MAC PDU.

The UE processor sends the generated headerless MAC PDU. The UE processor may be configured to send the headerless MAC PDU via a PUSCH based on the UL grant. For example, the UE processor may control the UE transceiver to transmit the headerless MAC PDU via the PUSCH based the UL grant.

A processor (hereinafter, NT processor) of a network (e.g. BS) may generate zeroHeaderInfo, and transfer it to a transceiver (hereinafter, NT transceiver). The NT transceiver may transmit radio signals including zeroHeaderInfo under the control of the NT processor.

The NT processor (or the NT transceiver under the control of the NT processor) may transmit zeroHeaderInfo to a UE via L1, L2, or L3 signalling. For example, the NT processor or the NT transceiver may transmit the zeroHeaderInfo via:

an UL grant scheduling a new transmission (e.g., DCI); or a BWP switching command (e.g., DCI); or a CG activation command; or MAC signaling that is related to CG/BWP/Carrier/Cell/MAC/UE (e.g., SCell Activation/Deactivation MAC CE); or RRC signaling that is related to CG/BWP/Carrier/Cell/MAC/UE (e.g., CG configuration, BWP configuration, Cell configuration, MAC configuration, etc).

The NT processor (or the NT transceiver under the control of the NT processor) may provide a UE with zeroHeaderInfo per logical channel, per MAC Control Element (CE), per UL grant, per Configured Grant (CG), per Bandwidth Part (BWP)/Carrier/Cell, per MAC entity, and/or per UE.

The NT processor (or the NT transceiver under the control of the NT processor) may transmit an UL grant dynamically on a physical downlink control channel (PDCCH) or in a random access response to the UE, or configure UL grant semi-persistently to the UE by RRC signalling. For example, The NT processor (or the NT transceiver under the control of the NT processor) may send an UL grant for a new transmission in uplink to the UE (or the UE MAC entity). The NT processor (or the NT transceiver under the control of the NT processor) may send the UL grant in response to the SR or random access preamble transmitted by the UE MAC entity.

The NT processor (or the NT transceiver under the control of the NT processor) may receive a headerless MAC PDU transmitted on the UL resource according to the (dynamic or configured) UL grant. The NT processor/transceiver may receive the headerless MAC PDU via a PUSCH based on the UL grant.

When the NT processor receives the headerless MAC PDU including no MAC subheader for a certain MAC subPDU, the NT processor may decode the headerless MAC PDU based on the transmitted zeroHeaderInfo associated with that UL grant.

Some implementations of the present disclosure can be applied to downlink communication. In this case, the NT processor provides zeroHeaderInfo for downlink to a UE. The zeroHeaderInfo may include information on the detailed format of a headerless MAC PDU. The NT processor may generate a MAC PDU based on the zeroHeaderInfo and transmit the generated MAC PDU. When the UE processor receives a MAC PDU, the UE processor may determine whether the received MAC PDU is a headerless MAC PDU or not according to the received zeroHeaderInfo for downlink. If the UE processor receives a headerless MAC PDU, the UE processor may decode the received headerless MAC PDU according to the zeroHeaderInfo, even if the headerless MAC PDU includes no MAC subheader for a MAC subPDU.

In some scenarios, a UE may provide the network (e.g. BS) with i) information regarding how often uplink traffic occurs in the UE and/or ii) information regarding the amount of uplink traffic. The network may determine whether to provide the UE with zeroHeaderInfo for uplink based on i) the information regarding how often uplink traffic occurs in the UE and/or ii) the information regarding the amount of uplink traffic. For example, when uplink traffic occurs frequently in the UE (e.g. more frequent than a first threshold value) and/or when the amount of uplink traffic per transmission opportunity/occasion is below a second threshold value, the network may provide the UE with zeroHeaderInfo for uplink. The first threshold value and/or the second threshold value may be predefined in the standards document, or configured by the network.

In some scenarios, a core network may provide the network (e.g. BS) with i) information regarding how often downlink traffic for the UE occurs and/or ii) information regarding the amount of downlink traffic. The network may determine whether to provide the UE with zeroHeaderInfo for downlink based on i) the information regarding how often downlink traffic for the UE occurs and/or ii) the information regarding the amount of downlink traffic. For example, when downlink traffic for the UE occurs frequently (e.g. more frequent than a third threshold value) and/or when the amount of downlink traffic per transmission opportunity/occasion is below a fourth threshold value, the network may provide the UE with zeroHeaderInfo for downlink. The third threshold value and/or the fourth threshold value may be predefined in the standards document, or configured by the network or core network.

Given that a MAC subheader size is 1 byte to 3 bytes, if there is always a MAC subheader for every MAC subPDU, the accumulated amount MAC subheaders within a MAC PDU could be critically large. Increased overhead due to MAC subheaders would have negative impact on radio resource efficiency from system perspective, especially when there are massive UEs.

Moreover, in factory automation or IoT scenarios, data size would be typically small, e.g., less than 10 bytes, but could be rather frequently occurred for measuring/reporting environment. Therefore, overhead due to MAC subheaders would not be welcome.

In the prior art, the transmitter generates a PDU by including header information so that the receiver can decode the received PDU by reading the header information. However, in future communication area, e.g., 5G NR, the network would have intention to allocate certain radio resources for reception of a certain logical channel data by considering traffic characteristics and radio resource characteristics. In this case, transmitting header information to the receiver seems only redundant and waste of radio resources because the receiver may already have an intended format of the PDU.

According to some implementations of the present disclosure, the transmitter does not attach a MAC subheader for a MAC subPDU if network allocates the radio resource dedicated to a certain logical channel or a certain MAC CE. Thus, signalling overhead can be reduced significantly. Reduced signalling overhead would have positive impact on resource efficiency so that radio resources can be utilized for actual data transmission instead of unnecessary header information transmission.

In addition, from transmitter point of view, the PDU format is pre-defined so that the transmitter does not need to perform a complex resource allocation step in generation of the MAC PDU. It would have positive impact to the transmitter in terms of processing time and complexity, which may also be good from End-to-End (E2E) latency perspective.

As described above, the detailed description of the preferred implementations of the present disclosure has been given to enable those skilled in the art to implement and practice the disclosure. Although the disclosure has been described with reference to exemplary implementations, those skilled in the art will appreciate that various modifications and variations can be made in the present disclosure without departing from the spirit or scope of the disclosure described in the appended claims. Accordingly, the disclosure should not be limited to the specific implementations described herein, but should be accorded the broadest scope consistent with the principles and novel features disclosed herein.

INDUSTRIAL APPLICABILITY

The implementations of the present disclosure are applicable to a network node (e.g., BS), a UE, or other devices in a wireless communication system.

The invention claimed is:

1. A method for transmitting, by a transmitting device, data units in a wireless communication system, the method comprising:
receiving a bandwidth part (BWP) switching command for scheduling a new transmission for a BWP via downlink control information (DCI) from a receiving device,
wherein the BWP switching command includes zero header information;
generating a medium access control (MAC) protocol data unit (PDU) based on the zero header information; and
transmitting the MAC PDU using any uplink (UL) resources on the BWP,
wherein the MAC PDU includes at least one headerless MAC subPDU, and
wherein the at least one headerless MAC subPDU contains data of any logical channel associated with the BWP, without a corresponding MAC subheader.

2. The method according to claim 1, wherein the zero header information includes information regarding a duration during which the zero header information is valid.

3. The method according to claim 1, wherein the zero header information includes an amount of the data of the logical channel to be included in the at least one headerless MAC subPDU.

4. The method according to claim 1, wherein the zero header information includes information regarding a placement order of the at least one headerless MAC subPDU in the MAC PDU.

5. The method according to claim 1, further comprising:
based on there being remaining UL resources after assigning UL resources for the at least one headerless MAC subPDU, assigning the remaining UL resources to another MAC subPDU with a MAC subheader other than the at least one headerless MAC subPDU.

6. A transmitting device of transmitting data units in a wireless communication system, the transmitting device comprising:
a transceiver;
at least one processor; and
at least one computer memory operably connectable to the at least one processor and storing instructions that, when executed, cause the at least one processor to perform operations comprising:
receiving, via the transceiver, a bandwidth part (BWP) switching command for scheduling a new transmission for a BWP via downlink control information (DCI) from a receiving device,
wherein the BWP switching command includes zero header information;
generating a medium access control (MAC) protocol data unit (PDU) based on the zero header information; and
transmitting, via the transceiver, the MAC PDU using any uplink (UL) resources on the BWP,
wherein the MAC PDU includes at least one headerless MAC subPDU, and
wherein the at least one headerless MAC subPDU contains data of any logical channel associated with the BWP, without a corresponding MAC subheader.

7. The transmitting device according to claim 6, wherein the zero header information includes information regarding a duration during which the zero header information is valid.

8. The transmitting device according to claim 6, wherein the zero header information includes an amount of the data of the logical channel to be included in the at least one headerless MAC subPDU.

9. The transmitting device according to claim 6, wherein the zero header information includes information regarding a placement order of the at least one headerless MAC subPDU.

10. The transmitting device according to claim 6, wherein the operations further comprise:
based on there being remaining UL resources after assigning UL resources for the at least one headerless MAC subPDU, assigning the remaining UL resources to another MAC subPDU with a MAC subheader other than the at least one headerless MAC subPDU.

11. A method for receiving, by a receiving device, data units in a wireless communication system, the method comprising:
transmitting a bandwidth part (BWP) switching command for scheduling a new transmission for a BWP via downlink control information (DCI) to a transmitting device,
wherein the BWP switching command includes zero header information; and
receiving a medium access control (MAC) protocol data unit (PDU) based on the zero header information using any uplink (UL) resources on the BWP from the transmitting device,
wherein the MAC PDU includes at least one headerless MAC subPDU, and
wherein the at least one headerless MAC subPDU contains data of any logical channel associated with the BWP, without a corresponding MAC subheader.

12. The method according to claim 11, wherein the zero header information includes information regarding a duration during which the zero header information is valid.

13. The method according to claim 11, wherein the zero header information includes an amount of the data of the logical channel to be included in the at least one headerless MAC subPDU.

14. The method according to claim 11, wherein the at least one zero header information includes information regarding a placement order of the headerless MAC subPDU.

15. A receiving device of receiving data units in a wireless communication system, the method comprising:
a transceiver;
at least one processor; and
at least one computer memory operably connectable to the at least one processor and storing instructions that, when executed, cause the at least one processor to perform operations comprising:
transmitting a bandwidth part (BWP) switching command for scheduling a new transmission for a BWP via downlink control information (DCI) to a transmitting device,
wherein the BWP switching command includes zero header information; and
receiving a medium access control (MAC) protocol data unit (PDU) based on the zero header information using any uplink (UL) resources on the BWP from the transmitting device, wherein the MAC PDU includes at least one headerless MAC subPDU, and wherein the at least one headerless MAC subPDU contains data of any logical channel associated with the BWP, without a corresponding MAC subheader.

16. The receiving device according to claim 15, wherein the zero header information includes information regarding a duration during which the zero header information is valid.

\* \* \* \* \*